(12) United States Patent
Resconi et al.

(10) Patent No.: US 12,473,320 B2
(45) Date of Patent: Nov. 18, 2025

(54) CATALYST SYSTEM

(71) Applicant: BOREALIS AG, Vienna (AT)

(72) Inventors: Luigi Maria Cristoforo Resconi, Linz (AT); Wilfried Toeltsch, Linz (AT); Ville Virkkunen, Porvoo (FI); Kalle Kallio, Porvoo (FI); Soile Lustig, Porvoo (FI); Noureddine Ajellal, Porvoo (FI); Marja Mustonen, Porvoo (FI); Alexander Reznichenko, Porvoo (FI)

(73) Assignee: BOREALIS AG, Vienna (AT)

( * ) Notice: Subject to any disclaimer, the term of this patent is extended or adjusted under 35 U.S.C. 154(b) by 740 days.

(21) Appl. No.: 17/614,744

(22) PCT Filed: May 20, 2020

(86) PCT No.: PCT/EP2020/064194
§ 371 (c)(1),
(2) Date: Nov. 29, 2021

(87) PCT Pub. No.: WO2020/239602
PCT Pub. Date: Dec. 3, 2020

(65) Prior Publication Data
US 2022/0220231 A1    Jul. 14, 2022

(30) Foreign Application Priority Data

May 29, 2019  (EP) .................................... 19177307
May 29, 2019  (EP) .................................... 19177308

(51) Int. Cl.
*C07F 17/00*    (2006.01)
*C08F 4/649*    (2006.01)
(Continued)

(52) U.S. Cl.
CPC ............ *C07F 17/00* (2013.01); *C08F 4/6492* (2013.01); *C08F 4/65908* (2013.01);
(Continued)

(58) Field of Classification Search
CPC .... C07F 17/00; C08F 4/6492; C08F 4/65908; C08F 4/65912; C08F 4/65916;
(Continued)

(56) References Cited

U.S. PATENT DOCUMENTS 7,429,635 B2    9/2008  Wang et al.
2001/0044505 A1  11/2001  Ford et al.
(Continued)

FOREIGN PATENT DOCUMENTS

EP    0768320    4/1997
EP    1828266    7/2015
(Continued)

OTHER PUBLICATIONS

Cheng, H. N. "Carbon-13 NMR analysis of ethylene-propylene rubbers." Macromolecules 17.10 (1984): 1950-1955.
(Continued)

*Primary Examiner* — Anthony J Zimmer
*Assistant Examiner* — Zachary John Baum
(74) *Attorney, Agent, or Firm* — Meunier Carlin & Curfman LLC

(57) ABSTRACT

A specific class of metallocene complexes in combination with a boron containing cocatalyst and an aluminoxane cocatalyst, its use for producing propylene homopolymers, propylene copolymers, especially with ethylene, as well as heterophasic propylene copolymers, preferably in a multi-step process including a gas phase polymerization step.

17 Claims, 4 Drawing Sheets

(51) Int. Cl.
  *C08F 4/659* (2006.01)
  *C08F 4/6592* (2006.01)
  *C08F 10/06* (2006.01)
  *C08F 110/06* (2006.01)

(52) U.S. Cl.
  CPC ...... *C08F 4/65912* (2013.01); *C08F 4/65916* (2013.01); *C08F 4/65927* (2013.01); *C08F 10/06* (2013.01); *C08F 110/06* (2013.01); *C08F 2420/00* (2013.01); *C08F 2420/08* (2021.01); *C08F 2500/12* (2013.01); *C08F 2500/17* (2013.01); *C08F 2500/34* (2021.01); *C08F 2500/35* (2021.01); *C08F 2800/10* (2013.01)

(58) Field of Classification Search
  CPC .... C08F 4/65927; C08F 10/06; C08F 110/06; C08F 2420/08; C08F 2500/34; C08F 2500/35; C08F 2420/00; C08F 2500/12; C08F 2500/17; C08F 2800/10
  USPC .......................................................... 502/154
  See application file for complete search history.

(56) References Cited

U.S. PATENT DOCUMENTS

| | | | |
|---|---|---|---|
| 2003/0203809 | A1 | 10/2003 | Kao et al. |
| 2004/0254310 | A1 | 12/2004 | Winslow et al. |
| 2006/0116490 | A1 | 6/2006 | Paczkowski et al. |
| 2008/0081887 | A1 | 4/2008 | Wang et al. |
| 2009/0221772 | A1* | 9/2009 | Sacco ............... C08F 210/06 549/209 |
| 2018/0155459 | A1 | 6/2018 | Li et al. |

FOREIGN PATENT DOCUMENTS

| | | |
|---|---|---|
| EP | 2545083 B1 | 6/2016 |
| EP | 2545084 | 8/2017 |
| EP | 3456776 | 3/2019 |
| KR | 20170073463 | 6/2017 |
| WO | 94/14856 | 7/1994 |
| WO | 95/12622 | 5/1995 |
| WO | 2002/002576 | 1/2002 |
| WO | 2002/040549 | 5/2002 |
| WO | 2006/097497 | 9/2006 |
| WO | 2007/116034 | 10/2007 |
| WO | 2011/076780 | 6/2011 |
| WO | 2011/135004 | 11/2011 |
| WO | 2012/001052 | 1/2012 |
| WO | 2012/084961 | 6/2012 |
| WO | 2013/007650 | 1/2013 |
| WO | WO-2013007664 A1 * | 1/2013 ............. C07C 13/36 |
| WO | 2014/096171 | 12/2013 |
| WO | 2014/060540 | 4/2014 |
| WO | 2015/158790 | 10/2015 |
| WO | 2015/161150 | 10/2015 |
| WO | 2018091684 A1 | 5/2018 |
| WO | 2018/122134 | 7/2018 |
| WO | WO-2018132247 A2 * | 7/2018 ............. C08F 10/06 |
| WO | 2019/007655 | 1/2019 |
| WO | 2019/179959 | 9/2019 |
| WO | 2019/215122 | 11/2019 |

OTHER PUBLICATIONS

Del Hierro P et al. Soluble Fraction Analysis in polypropylene, The Column, 2014, 10(2), p. 18-23.

Resconi, Luigi, et al. "Selectivity in propene polymerization with metallocene catalysts." Chemical Reviews 100.4 (2000): 1253-1346.

Wang, Wen-Jun, and Shiping Zhu. "Structural analysis of ethylene/propylene copolymers synthesized with a constrained geometry catalyst." Macromolecules 33.4 (2000): 1157-1162.

Busico, Vincenzo, et al. "Alk-1-ene Polymerization in the Presence of a Monocyclopentadienyl Zirconium (iv) Acetamidinate Catalyst: Microstructural and Mechanistic Insights." Macromolecular rapid communications 28.10 (2007): 1128-1134.

International Search Report and Written opinion mailed Aug. 25, 2020 in PCT/EP2020/064183 (15 pages).

International Search Report and Written opinion mailed Aug. 24, 2020 in PCT/EP2020/064194 (14 pages).

International Search Report and Written opinion mailed Sep. 3, 2020 in PCT/EP2020/064197 (12 pages).

* cited by examiner

CATALYST SYSTEM

CROSS REFERENCE TO RELATED APPLICATIONS

This application is a United States National Phase Patent Application filed under 35 U.S.C. § 371 of PCT/EP2020/064194, filed May 20, 2020, which claims priority to European Patent Application No. 19177308.4, filed May 29, 2019, and European Patent Application No. 19177307.6, filed May 29, 2019.

FIELD OF INVENTION

The present invention relates to a new, improved silica supported catalyst system, which comprises a specific class of metallocene complexes in combination with a boron containing cocatalyst and an aluminoxane cocatalyst. The invention also relates to the use of the new, improved catalyst system to produce propylene homopolymers, propylene copolymers, especially with ethylene, as well as heterophasic propylene copolymers, preferably in a multistep process including a gas phase polymerization step. The catalyst system is especially useful in the manufacture of propylene ethylene copolymers as it exhibits remarkable catalyst activity in such polymerizations.

BACKGROUND OF INVENTION

Metallocene catalysts have been used to manufacture polyolefins for many years. Countless academic and patent publications describe the use of these catalysts in olefin polymerization. Metallocenes are now used industrially and polyethylenes and polypropylenes in particular are often produced using cyclopentadienyl based catalyst systems with different substitution patterns.

Metallocene catalysts are used in propylene polymerization in order to achieve specific polymer properties.

However, there are some problems in using metallocene catalysts on industrial scale especially in multistage polymerization configurations.

Thus, there is room for improving the process and catalyst behaviour for such processes. Some multistage polymerizations utilise a sequence of two or more reactors in which the first one is a reactor (typically a loop reactor) operating in liquid monomer slurry (also called bulk polymerization) while the second and subsequent reactors are operated in gas phase. One of the possible limitations of polymerization catalysts in general, and of metallocene-based catalysts in particular, is that when the catalyst has a high activity in the liquid monomer reactor (bulk step), the activity in the gas phase reactors is often too low to achieve the desired bulk-to-gas phase ratio of the produced material (the so-called bulk/GP split), especially when this ratio has to be below 2.

To be relevant for industrial polypropylene production, a metallocene catalyst must have good performance under all polymerization conditions, in particular in conditions, where polymerization temperature is at least 60° C., and in all actual polymerization reactors of the multistage process including both liquid (ideally bulk slurry) and gas phase reactors.

One problem is that during copolymerization of propylene and comonomer, like ethylene, a faster catalyst decay and MFR increase takes place compared to propylene homopolymerization.

Especially in industrial production of heterophasic copolymers in a three-stage polymerization a catalyst must have, inter alia, a long enough lifetime to have still acceptable activity in the third reactor, in which the rubber phase is produced. Here one problem is, that when the catalyst has a high activity in bulk and in the first gas phase (GPR1) reactors, the activity in the second gas phase reactor (GPR2) is often low, not allowing attainment of a high GPR2-to-bulk+GPR1 ratio of the produced material (the so-called rubber split). This means that strong (initial) activity in the bulk step can lead to faster catalyst deactivation, in turn leading to a poorly active catalyst in the second gas phase reactor.

Thus, it is desired to find catalyst systems, which provide high and stable activity, especially in the case of copolymerization between propylene and α-olefins of 4 to 8 C atoms and/or ethylene to form propylene copolymers. The stable catalyst activity means that the catalyst activity decay over the residence time in the reactor should be limited in order to ensure high gas phase activity. Various prior art references aim for one or more of these features.

C2-symmetric metallocenes are disclosed for example in WO2007/116034. This document reports the synthesis and characterisation of, inter alia, the metallocene rac-Me2Si(2-Me-4-Ph-5-OMe-6-tBuInd)2ZrCl2 and the use of it as a polymerization catalyst after activation with MAO for the homopolymerization of propylene and copolymerization of propylene with ethylene and higher alpha-olefins in solution polymerization.

WO 02/02576 and WO 2014/096171 describe, inter alia, rac-Me$_2$Si[2-Me-4-(3,5-Me$_2$Ph)Ind]$_2$ZrCl$_2$ and its use in the manufacture of high Mw and high melting point polypropylene.

The metallocene catalysts of WO 02/02576, activated with either MAO or a borate, are supported on a silica carrier. At polymerization temperatures of 60° C. or 70° C. they give iPP with Tm between 156° C. and 159° C. but at very poor catalyst activity.

The metallocene catalysts of WO 2014/096171 are produced with an emulsion/solidification technology with subsequent off-line prepolymerization of the catalyst, which enables the production of i-PP with higher Tm and at the same time higher activity compared to the metallocene catalysts of WO 02/02576.

WO 06/097497 describes, inter alia, rac-Me$_2$Si(2-Me-4-Ph-1,5,6,7-tetrahydro-s-indacen-1-yl)$_2$ZrCl$_2$ supported on silica and its use in the homo- and copolymerization of propylene with ethylene.

WO 2013/007650 describes certain asymmetrical catalysts comprising alkoxy groups at the 5-position of one of the rings such as dimethylsilylene (6-tert-butyl-5-methoxy-2-methyl-4-phenyl-1H-inden-1-yl)-(6-tert-butyl-2-methyl-4-phenyl-1H-inden-1-yl)zirconium dichloride. Despite its good performance, catalysts based on this reference are limited in terms of polypropylene homopolymer melting temperature and productivity at low MFR. In addition, the overall productivity of the catalyst still needs to be improved.

WO 2015/158790 discloses, inter alia, the complex [dimethylsilanediyl [6-tert-butyl-4-(3,5-di-tert-butylphenyl)-5-methoxy-2-methylinden-1-yl]-[4-(3,5-di-tert-butylphenyl)-2-methyl-5,6,7-trihydro-s-indacen-1-yl]zirconium dichloride] and describes the use of this complex in the formation of ethylene/1-octene copolymers in a solution process.

WO 2018/122134 describes, inter alia the complex rac-anti-dimethylsilanediyl[2-methyl-4-(3',5'-dimethylphenyl)-

1,5,6,7-tetrahydro-s-indacen-1-yl][2-methyl-4-(3',5'-dimethylphenyl)-5-methoxy-6-tert-butylinden-1-yl]zirconium dichloride, which is activated with MAO and is supported on silica.

Although a lot of work has been done in the field of metallocene catalysts, there still remain some problems, which relate mainly to the productivity or activity of the catalysts, in particular in multistage polymerization processes, since the productivity or activity has been found to be relatively low, especially when polymers of low melt index (MI) (i.e. high molecular weight, Mw) are produced.

The inventors have identified a supported catalyst system composed of a specific class of metallocene catalysts in combination with a boron containing cocatalyst and an aluminoxane cocatalyst having improved polymerization behaviour, higher catalyst productivity, improved performance in the production of propylene homopolymers, propylene random copolymers and heterophasic propylene copolymers compared to systems known in the art, enabling the production of propylene-ethylene copolymers of high Mw, thus being ideal for the production of propylene random copolymers, especially propylene-ethylene random copolymers, and also suitably heterophasic propylene copolymers. The specific catalyst system gives a higher flexibility/freedom in the design of propylene polymers than prior art catalyst systems.

SUMMARY OF THE INVENTION

Viewed from one aspect the invention provides a supported catalyst system comprising
(i) a metallocene complex of formula (I):

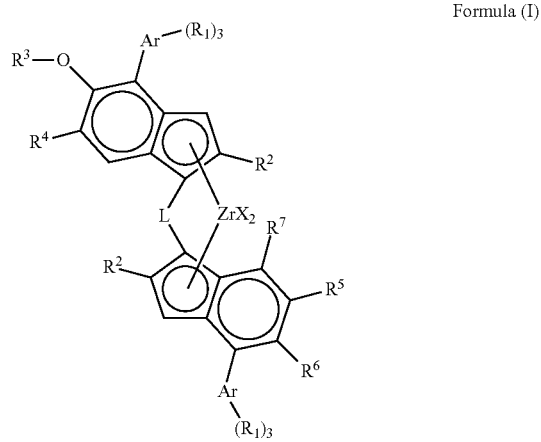

Formula (I)

wherein
each X independently is a sigma-donor ligand,
L is a carbon, silicon or germanium based divalent bridge in which one or two backbone atoms link the ligands;
each Ar is an aryl or heteroaryl group having 3 to 20 carbon atoms, such as a phenyl ring or a 5 or 6 membered heteroaryl group;
each $R^1$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group, and optionally two adjacent $R^1$ groups can be part of a ring including the carbons to which they are bonded,
each $R^2$ independently are the same or can be different and are a CHR$^{8'}$—R$^8$ group, with R$^8$ being H or linear or branched $C_{1-6}$-alkyl group, $C_{3-8}$-cycloalkyl group, $C_{6-10}$-aryl group, or a heteroaryl group having 3 to 20 carbon atoms optionally substituted by one to three groups $R^{11}$, and $R^{8'}$ is H or a $C_{1-6}$ alkyl;
$R^3$ is a linear or branched $C_1$-$C_6$-alkyl group, $C_{7-20}$-arylalkyl, $C_{7-20}$-alkylaryl group or $C_6$-$C_{20}$-aryl group;
$R^4$ is a C($R^9$)$_3$ group, with $R^9$ being a linear or branched $C_1$-$C_6$-alkyl group;
$R^5$ is hydrogen or an aliphatic $C_1$-$C_{20}$-hydrocarbyl group optionally containing one or more heteroatoms from groups 14-16 of the periodic table of elements;
$R^6$ is hydrogen or an aliphatic $C_1$-$C_{20}$-hydrocarbyl group optionally containing one or more heteroatoms from groups 14-16 of the periodic table of elements; or
$R^5$ and $R^6$ can be taken together to form a 5 membered saturated carbon ring which is optionally substituted by n groups $R^{10}$, n being from 0 to 4;
each $R^{10}$ is same or different and may be a $C_1$-$C_{20}$-hydrocarbyl group, or a $C_1$-$C_{20}$-hydrocarbyl radical optionally containing one or more heteroatoms belonging to groups 14-16 of the periodic table of elements;
$R^7$ is H or a linear or branched $C_1$-$C_6$-alkyl group or an aryl or heteroaryl group having 3 to 20 carbon atoms optionally substituted by one to three groups $R^{11}$ such as a phenyl ring or a 5 or 6 membered heteroaryl group;
each $R^{11}$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group;
(ii) a cocatalyst system comprising a boron containing cocatalyst and an aluminoxane cocatalyst,
(iii) a porous inorganic support.

Viewed from one aspect the invention provides a supported catalyst system comprising
(i) a metallocene complex of formula (II):

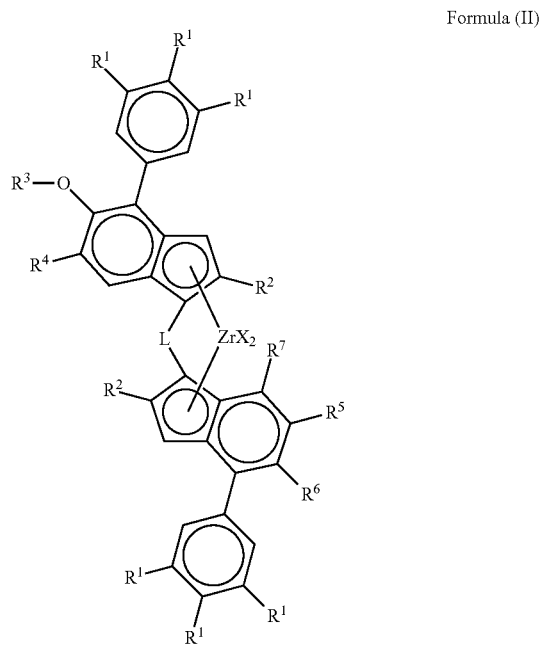

Formula (II)

wherein each X independently is a sigma-donor ligand,
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom or a C$_1$-C$_{20}$-hydrocarbyl group optionally containing one or more heteroatoms of Group 14-16 of the periodic table or fluorine atoms, or optionally two R' groups taken together can form a ring,
each R$^1$ are independently the same or can be different and are hydrogen, a linear or branched C$_1$-C$_6$-alkyl group, a C$_{7-20}$ arylalkyl, C$_{7-20}$ alkylaryl group or C$_{6-20}$ aryl group or an OY group, wherein Y is a C$_{1-10}$ hydrocarbyl group, and optionally two adjacent R$^1$ groups can be part of a ring including the phenyl carbons to which they are bonded,
each R$^2$ independently are the same or can be different and are a CH$_2$—R$^8$ group, with R$^8$ being H or linear or branched C$_{1-6}$-alkyl group, C$_{3-8}$ cycloalkyl group, C$_{6-10}$ aryl group,
R$^3$ is a linear or branched C$_1$-C$_6$-alkyl group, C$_{7-20}$ arylalkyl, C$_{7-20}$ alkylaryl group or C$_6$-C$_{20}$-aryl group,
R$^4$ is a C(R$^9$)3 group, with R$^9$ being a linear or branched C$_1$-C$_6$ alkyl group,
R$^5$ is hydrogen or an aliphatic C$_1$-C$_{20}$ hydrocarbyl group optionally containing one or more heteroatoms from groups 14-16 of the periodic table of elements;
R$^6$ is hydrogen or an aliphatic C$_1$-C$_{20}$ hydrocarbyl group optionally containing one or more heteroatoms from groups 14-16 of the periodic table of elements; or
R$^5$ and R$^8$ can be taken together to form a 5 membered saturated carbon ring which is optionally substituted by n groups R$^{10}$, n being from 0 to 4;
each R$^{10}$ is same or different and may be a C$_1$-C$_{20}$ hydrocarbyl group, or a C$_1$-C$_{20}$ hydrocarbyl radical optionally containing one or more heteroatoms belonging to groups 14-16 of the periodic table of elements;
R$^7$ is H or a linear or branched C$_1$-C$_6$-alkyl group or an aryl or heteroaryl group having 6 to 20 carbon atoms optionally substituted by one to 3 groups R$^{11}$,
each R$^{11}$ are independently the same or can be different and are hydrogen, a linear or branched C$_1$-C$_6$-alkyl group, a C$_{7-20}$ arylalkyl, C$_{7-20}$ alkylaryl group or C$_{6-20}$ aryl group or an OY group, wherein Y is a C$_{1-10}$ hydrocarbyl group,
(ii) a cocatalyst system comprising a boron containing cocatalyst and an aluminoxane cocatalyst; and
(iii) a silica support.

In a further aspect the present invention relates to a process for producing a propylene homopolymer, a propylene random copolymer or a heterophasic propylene copolymer using the specific catalyst system, as defined before.

The catalyst system according to the invention is especially suitable in a multistage process comprising at least two reactors connected in series including at least one gas phase polymerization step.

Viewed from another aspect the invention provides the use in olefin polymerization of a catalyst system as hereinbefore defined, for the formation of a propylene homopolymer, a propylene random copolymer or a heterophasic propylene copolymer comprising a matrix polypropylene homopolymer and an amorphous propylene copolymer (A) dispersed in said matrix (M).

By using the catalyst system of the present invention, a very high activity can be obtained e.g. in a multistage polymerization process, especially in the gas phase polymerization step and even in the second gas phase polymerization step, if present, much higher than the activity of the similar catalysts with a different substitution pattern. The advantage of having high activity in the first and in an optional second gas phase is not only in the higher overall productivity of the process, but also in the achievable range of polymer properties: for example a higher gas phase split enables the production of polypropylenes with broader molecular weight distribution. In the context of a heterophasic propylene copolymer, the control of the gas phase split allows manipulation of the xylene soluble content of the polymer, that is, its physical and mechanical properties.

In addition, the catalyst system of the present invention, especially with MAO and borate as cocatalysts, shows higher productivity, especially in the production of polypropylene copolymers with ethylene, compared to catalyst systems without a boron containing cocatalyst. This effect surprisingly increases with the amount of ethylene added and can be expressed by the inequation (I):

$$\Delta \text{ productivity } [kg_{PP}/g_{cat}] > 10 \times C_2 \text{ [wt \%]}$$

in which Δproductivity is the difference between the productivity of the metallocene-MAO-borate catalyst and the productivity of the metallocene-MAO catalyst at a given ethylene concentration in the monomer feed in propylene-ethylene copolymerizations performed under strictly comparable conditions.

Definitions

Throughout the description, the following definitions are employed.

The term "C$_{1-20}$ hydrocarbyl group" includes C$_{1-20}$-alkyl, C$_{2-20}$-alkenyl, C$_{2-20}$-alkynyl, C$_{3-20}$-cycloalkyl, C$_{3-20}$-cycloalkenyl, C$_{6-20}$-aryl groups, C$_{7-20}$-alkylaryl groups or C$_{7-20}$-arylalkyl groups or mixtures of these groups such as cycloalkyl substituted by alkyl. Linear and branched hydrocarbyl groups cannot contain cyclic units. Aliphatic hydrocarbyl groups cannot contain aryl rings.

Unless otherwise stated, preferred C$_{1-20}$ hydrocarbyl groups are C$_{1-20}$ alkyl, C$_{4-20}$ cycloalkyl, C$_{5-20}$ cycloalkylalkyl groups, C$_{7-20}$ alkylaryl groups, C$_{7-20}$ arylalkyl groups or C$_{6-20}$ aryl groups, especially C$_{1-10}$ alkyl groups, C$_{6-10}$ aryl groups, or C$_{7-12}$ arylalkyl groups, e.g. C$_{1-8}$ alkyl groups. Most especially preferred hydrocarbyl groups are methyl, ethyl, propyl, isopropyl, tert-butyl, isobutyl, C$_{5-6}$-cycloalkyl, cyclohexylmethyl, phenyl or benzyl.

The term "halo" includes fluoro, chloro, bromo and iodo groups, especially chloro or fluoro groups, when relating to the complex definition.

Any group including "one or more heteroatoms belonging to groups 14-16 of the periodic table of elements" preferably means O, S or N. N groups may present as —NH— or —NR"— where R" is C1-C10 alkyl. There may, for example, be 1 to 4 heteroatoms. The group including one or more heteroatoms belonging to groups 14-16 of the periodic table of elements may also be an alkoxy group, e.g. a C1-C10-alkoxy group.

The oxidation state of the metal ion is governed primarily by the nature of the metal ion in question and the stability of the individual oxidation states of each metal ion.

It will be appreciated that in the complexes of the invention, the metal ion M is coordinated by ligands X so as to satisfy the valency of the metal ion and to fill its available coordination sites. The nature of these σ-ligands can vary greatly.

The term heteroaryl defines an aromatic mono or multi-cyclic group in which one or more heteroatoms belonging to groups 14-16 of the periodic table are present in one or more of the rings. Such groups may comprise 3 to 20 carbon atoms and one or more heteroatoms selected from O, S and N.

Catalyst activity is defined in this application to be the amount of polymer produced per gram of catalyst per hour. Catalyst metallocene activity is defined here to be the amount of polymer produced per gram of metallocene per hour. The term productivity is also sometimes used to indicate the catalyst activity although herein it designates the amount of polymer produced per unit weight of catalyst.

The term "molecular weight" is used herein to refer to weight average molecular weight Mw unless otherwise stated.

DETAILED DESCRIPTION OF THE INVENTION

This invention relates to a new, improved supported catalyst system, which comprises a specific class of metallocene complexes in combination with a boron containing cocatalyst and an aluminoxane cocatalyst and hence catalyst systems that are ideal for the polymerization of propylene. The metallocene catalyst complexes of the invention are either symmetrical or asymmetrical. Asymmetrical means simply that the two indenyl ligands coordinated to the transition metal centre of the metallocene are different, that is, each ligand bears a set of substituents that are chemically different. In this context, the definition of indenyl ligands includes also indacenyl.

The metallocene catalyst complexes of the invention may be chiral, racemic bridged bisindenyl metallocenes in their anti-configuration. The metallocenes of the invention may be either C2-symmetric or C1-symmetric. When they are C1-symmetric they still maintain a pseudo-C2-symmetry since they maintain C2-symmetry in close proximity of the metal center, although not at the ligand periphery. By nature of their chemistry, both a meso form and a racemic enantiomer pair (in case of C2-symmetric complexes) or anti and syn enantiomer pairs (in case of C1-symmetric complexes) are formed during the synthesis of the complexes. For the purpose of this invention, racemic-anti means that the two indenyl ligands are oriented in opposite directions with respect to the cyclopentadienyl-metal-cyclopentadienyl plane, while racemic-syn means that the two indenyl ligands are oriented in the same direction with respect to the cyclopentadienyl-metal-cyclopentadienyl plane, as shown in the Figure below.

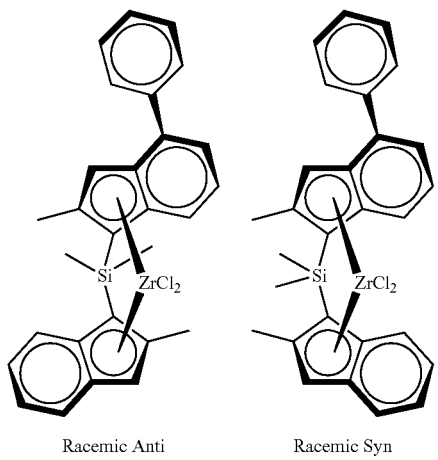

Racemic Anti     Racemic Syn

Formula (I), and any sub formulae, are intended to cover both syn- and anti-configurations. Preferred metallocene catalyst complexes are in the anti configuration.

The metallocene catalyst complexes of the invention may be employed as the racemic-anti isomers. Ideally, therefore at least 95% mol, such as at least 98% mol, especially at least 99% mol of the metallocene catalyst complex is in the racemic-anti isomeric form.

In the metallocene catalyst complexes of the invention the following preferences apply. Metallocene catalyst complexes according to the invention are of formula (I)

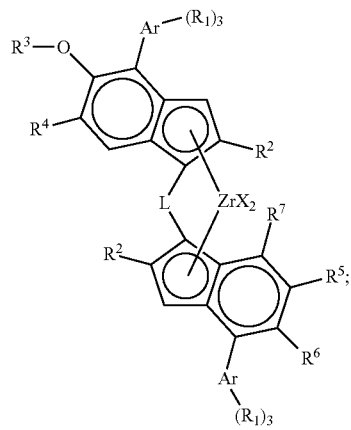

Formula (I)

preferably of formula (II)

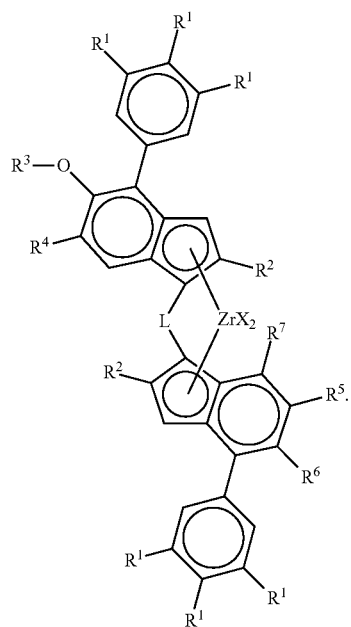

(II)

In any formula of the invention, the following preferred features apply.

Each X independently is a sigma-donor ligand. Thus each X may be the same or different, and is preferably a hydrogen atom, a halogen atom, a linear or branched, cyclic or acyclic $C_{1-20}$-alkyl or -alkoxy group, a $C_{6-20}$-aryl group, a $C_{7-20}$- alkylaryl group or a $C_{7-20}$-arylalkyl group; optionally containing one or more heteroatoms of Group 14-16 of the periodic table.

The term halogen includes fluoro, chloro, bromo and iodo groups, preferably chloro groups. The term heteroatoms belonging to groups 14-16 of the periodic table includes for example Si, N, O or S.

More preferably, each X is independently a hydrogen atom, a halogen atom, a linear or branched $C_{1-6}$-alkyl or $C_{1-6}$-alkoxy group, a phenyl or benzyl group.

Yet more preferably, each X is independently a halogen atom, a linear or branched $C_{1-4}$-alkyl or $C_{1-4}$-alkoxy group, a phenyl or benzyl group.

Most preferably, each X is independently chlorine, benzyl or a methyl group.

Preferably, both X groups are the same.

The most preferred options for both X groups are two chlorides, two methyl or two benzyl groups.

L is a divalent bridge based on carbon, silicon or germanium. There are one or two backbone linking atoms between the two ligands, e.g. a structure such as ligand-C-ligand (one backbone atom) or ligand-Si—Si-ligand (two backbone atoms).

The bridging atoms can carry other groups. For example, suitable bridging ligands L are selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom or a $C_1$-$C_{20}$-hydrocarbyl group optionally containing one or more heteroatoms of Group 14-16 of the periodic table or fluorine atoms, or optionally two R' groups taken together can form a ring. In one embodiment R' can be an alkyl having 1 to 10 carbon atoms substituted with alkoxy having 1 to 10 carbon atoms.

The term heteroatoms belonging to groups 14-16 of the periodic table includes for example Si, N, O or S.

Preferably L is —R'$_2$Si—, ethylene or methylene.

In the formula —R'$_2$Si—, each R' is preferably independently a $C_{1-20}$-hydrocarbyl group. The term $C_{1-20}$-hydrocarbyl group therefore includes $C_{1-20}$-alkyl, $C_{2-20}$-alkenyl, $C_{2-20}$-alkynyl, $C_{3-20}$-cycloalkyl, $C_{3-20}$-cycloalkenyl, $C_{6-20}$-aryl groups, $C_{7-20}$-alkylaryl groups or $C_{7-20}$-arylalkyl groups or of course mixtures of these groups such as cycloalkyl substituted by alkyl. Unless otherwise stated, preferred $C_{1-20}$-hydrocarbyl groups are $C_{1-20}$-alkyl, $C_{4-20}$-cycloalkyl, $C_{5-20}$-cycloalkyl-alkyl groups, $C_{7-20}$-alkylaryl groups, $C_{7-20}$-arylalkyl groups or $C_{6-20}$-aryl groups.

In one embodiment the formula —R'$_2$Si—, represents silacycloalkanediyls, such as silacyclobutane, silacyclopentane, or 9-silafluorene.

Preferably, both R' groups are the same. It is preferred if R' is a $C_1$-$C_{10}$-hydrocarbyl or $C_6$-$C_{10}$-aryl group, such as methyl, ethyl, propyl, isopropyl, tertbutyl, isobutyl, $C_{3-8}$-cycloalkyl, cyclohexylmethyl, phenyl or benzyl, more preferably both R' are a $C_1$-$C_6$-alkyl, $C_{5-6}$-cycloalkyl or $C_6$-aryl group, and most preferably both R' are methyl or one is methyl and the other is cyclohexyl. Most preferably the bridge is —Si(CH$_3$)$_2$—.

Ar is an aryl or heteroaryl group having 3 to 20 carbon atoms, such as a phenyl ring or a 5 or 6 membered heteroaryl ring. Ar is preferably a phenyl group or 5 or 6 membered heteroaryl ring such as furanyl, thiophenyl, or pyridyl ring. It is preferred however, if the Ar groups are phenyl groups.

It is preferred that when the Ar group is a phenyl group then the $R_1$ substituents are in the 3,4,5-position of the ring (where the 1-position is attached to the indenyl ring).

Each $R^1$ are independently the same or can be different and are hydrogen, a linear or branched $C_1$-$C_6$-alkyl group, a $C_{7-20}$ arylalkyl, $C_{7-20}$ alkylaryl group or $C_{6-20}$ aryl group or an OY group, wherein Y is a $C_{1-10}$ hydrocarbyl group, and optionally two adjacent $R^1$ groups can be part of a ring including the phenyl carbons to which they are bonded.

Preferably, each $R^1$ are independently the same or can be different and are hydrogen, or a linear or branched $C_1$-$C_6$-alkyl group, like methyl or tert-butyl.

It is for example possible that the Ar ring, e.g. phenyl ring is unsubstituted (i.e. all 3 $R^1$ are hydrogen), or substituted in the para position only, like 4'-tert.-butyl phenyl, or di-substituted in the 3' and 5' position, like 3',5'-dimethylphenyl or 3',5'-ditert.-butylphenyl.

Furthermore, it is possible that both phenyl rings have the same substitution pattern or that the two phenyl rings have different substitution patterns.

It is therefore preferred if one or two $R^1$ groups is H. If two $R^1$ groups are H then the remaining $R^1$ group is preferably in the para position. If one $R^1$ group is H then the remaining $R^1$ groups are preferably in the meta positions.

Each $R^2$ independently are the same or can be different and are a CHR$^8$—R$^8$ group, with $R^8$ being H or linear or branched $C_{1-6}$-alkyl group, $C_{3-8}$-cycloalkyl group, $C_{6-10}$-aryl group, heteroaryl group having 3 to 20 carbon atoms optionally substituted by one to three groups $R^{11}$, and $R^{8'}$ is H or a $C_{1-6}$ alkyl.

Preferably $R^{8'}$ is H or methyl, especially H.

Preferably each $R^2$ independently are the same or can be different and are a CH$_2$—R$^8$ group, with $R^8$ being H or linear or branched $C_{1-6}$-alkyl group, $C_{3-8}$ cycloalkyl group, $C_{6-10}$ aryl group.

Preferably, both $R^2$ are the same and are a CH$_2$—R$^8$ group, with $R^8$ being H or linear or branched $C_1$-$C_4$-alkyl group, more preferably, both $R^2$ are the same and are a CH$_2$—R$^8$ group, with $R^8$ being H or linear or branched $C_1$-$C_3$-alkyl group. Most preferably, both $R^2$ are methyl.

$R^3$ is a linear or branched $C_1$-$C_6$-alkyl group, $C_{7-20}$ arylalkyl, $C_{7-20}$ alkylaryl group or $C_6$-$C_{20}$-aryl group.

$R^3$ is a preferably linear or branched $C_1$-$C_6$-alkyl group or $C_{6-20}$-aryl group, such as methyl, ethyl, n-propyl, i-propyl, n-butyl, i-butyl, sec.-butyl and tert.-butyl, preferably a linear $C_1$-$C_4$-alkyl group, more preferably a $C_1$-$C_2$-alkyl group and most preferably methyl.

$R^4$ is a C(R$^9$)3 group, with R$^9$ being a linear or branched $C_1$-$C_6$ alkyl group.

Preferably each $R^9$ are the same or different with $R^9$ being a linear or branched $C_1$-$C_4$-alkyl group, more preferably with $R^9$ being the same and being a $C_1$-$C_2$-alkyl group. Most preferably, $R^4$ is a tert.-butyl group and hence all $R^9$ groups are methyl.

In one embodiment of the present invention $R^5$ and $R^6$ independently are the same or can be different and are hydrogen or an aliphatic $C_1$-$C_{20}$-hydrocarbyl group optionally containing one or more heteroatoms from groups 14-16 of the periodic table of elements, like an alkoxy group, e.g. a $C_1$-$C_{10}$-alkoxy group.

Preferably, $R^5$ and $R^6$ independently are the same or can be different and are hydrogen or a linear or branched $C_1$-$C_6$ alkyl group or a $C_1$-$C_6$-alkoxygroup.

More preferably, $R^5$ and $R^6$ independently are the same or can be different and are hydrogen or a linear or branched $C_1$-$C_4$ alkyl group or a $C_1$-$C_4$-alkoxygroup.

In another embodiment $R^5$ and $R^6$ can be taken together to form a 5 membered saturated carbon ring which is optionally substituted by n groups $R^{10}$, n being from 0 to 4, preferably 0 or 2 and more preferably 0; whereby each $R^{10}$ can be the same or different and may be a $C_1$-$C_{20}$-hydrocarbyl group, or a $C_1$-$C_{20}$ hydrocarbyl radical optionally containing one or more heteroatoms belonging to groups 14-16 of the periodic table of elements; preferably a linear or branched $C_1$-$C_6$-alkyl group.

$R^7$ is H or a linear or branched $C_1$-$C_6$-alkyl group or an aryl or heteroaryl group having 3 to 20 carbon atoms optionally substituted by 1 to 3 groups $R^{11}$.

Preferably, $R^7$ is H or an aryl group having 6 to 10 carbon atoms optionally substituted by 1 to 3 groups $R^{11}$, more preferably $R^7$ is H or a phenyl group optionally substituted by 1 to 3 groups $R^{11}$.

In case $R^7$ is an optionally substituted aryl group having 6 to 10 carbon atoms, like phenyl, each $R^{11}$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group. It is most preferred if $R^7$ is not H.

It is most preferred if $R^7$ is a phenyl group optionally substituted by 1 to 3 groups $R^{11}$, more preferably $R^7$ is a phenyl group substituted by 1 to 2 groups $R^{11}$.

Where $R^7$ is not H and especially where $R^7$ is an aryl or heteroaryl group having 3 to 20 carbon atoms optionally substituted by 1 to 3 groups $R^{11}$ the metallocene complex is new and itself forms a further aspect of the invention.

Preferably, each $R^{11}$ are independently the same or can be different and are hydrogen, a linear or branched $C_1$-$C_6$-alkyl group or $C_{6-20}$-aryl groups or an OY-group, wherein Y is a is a $C_{1-4}$-hydrocarbyl group. More preferably, each $R^{11}$ are independently the same or can be different and are hydrogen or a linear or branched $C_1$-$C_4$-alkyl group or an OY-group, wherein Y is a $C_{1-4}$-hydrocarbyl group. Even more preferably, each $R^{11}$ are independently the same or can be different and are hydrogen, methyl, ethyl, isopropyl, tert.-butyl or methoxy, especially hydrogen, methyl or tert.-butyl. Even more preferably, each $R^{11}$ are independently the same or can be different and are methyl, ethyl, isopropyl, tert.-butyl or methoxy, especially, methyl or tert.-butyl.

If the aryl group, such as the phenyl group, is substituted, it is preferably substituted by 1 or 2 $R^{11}$ groups, such as non H $R^{11}$ groups.

It is most preferred if the 4-position group on the ligand and the $R^7$ group on the ligand are the same. Therefore, if $R^7$ is a 3,5-dimethylphenyl group, the group on position 4 of the ligand should be a 3,5-dimethylphenyl group. This is especially the case when the ring is an indacenyl ring.

In a more preferred embodiment, the metallocene complex may be of formula (III)

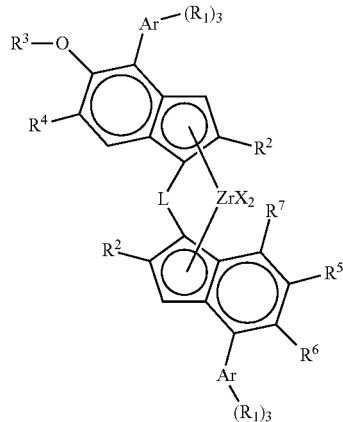

(III)

each X independently is a sigma-donor ligand,
L is a carbon, silicon or germanium based divalent bridge in which one or two backbone atoms link the ligands;
each Ar is an aryl or heteroaryl group having 3 to 20 carbon atoms, such as a phenyl ring or a 5 or 6 membered heteroaryl ring;
each $R^1$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group, and optionally two adjacent $R^1$ groups can be part of a ring including the carbons to which they are bonded,
each $R^2$ independently are the same or can be different and are a $CHR^{8'}$—$R^8$ group, with $R^8$ being H or linear or branched $C_{1-6}$-alkyl group, $C_{3-8}$-cycloalkyl group, $C_{6-10}$-aryl group, or a heteroaryl group having 3 to 20 carbon atoms optionally substituted by one to three groups $R^{11}$, and $R^{8'}$ is H or a $C_{1-6}$ alkyl;
$R^3$ is a linear or branched $C_1$-$C_6$-alkyl group, $C_{7-20}$-arylalkyl, $C_{7-20}$-alkylaryl group or $C_6$-$C_{20}$-aryl group;
$R^4$ is a $C(R^9)_3$ group, with $R^9$ being a linear or branched $C_1$-$C_6$-alkyl group;
$R^5$ is hydrogen or an aliphatic $C_1$-$C_{20}$-hydrocarbyl group optionally containing one or more heteroatoms from groups 14-16 of the periodic table of elements;
$R^6$ is hydrogen or an aliphatic $C_1$-$C_{20}$-hydrocarbyl group optionally containing one or more heteroatoms from groups 14-16 of the periodic table of elements; or
$R^5$ and $R^6$ can be taken together to form a 5 membered saturated carbon ring which is optionally substituted by n groups $R^{10}$, n being from 0 to 4;
each $R^{10}$ is same or different and may be a $C_1$-$C_{20}$-hydrocarbyl group, or a $C_1$-$C_{20}$-hydrocarbyl radical optionally containing one or more heteroatoms belonging to groups 14-16 of the periodic table of elements;
$R^7$ is a linear or branched $C_1$-$C_6$-alkyl group or an aryl or heteroaryl group having 3 to 20 carbon atoms optionally substituted by one to three groups $R^{11}$, such as a phenyl ring or a 5 or 6 membered heteroaryl ring
each $R^{11}$ are independently the same or can be different and are hydrogen, a linear or branched $C_1$-$C_6$-alkyl group, a $C_{7-20}$-arylalkyl, $C_{7-20}$-alkylaryl group or $C_{6-20}$-aryl group or an OY group, wherein Y is a $C_{1-10}$-hydrocarbyl group.

In a more preferred embodiment, the metallocene complex may be of formula (IV)

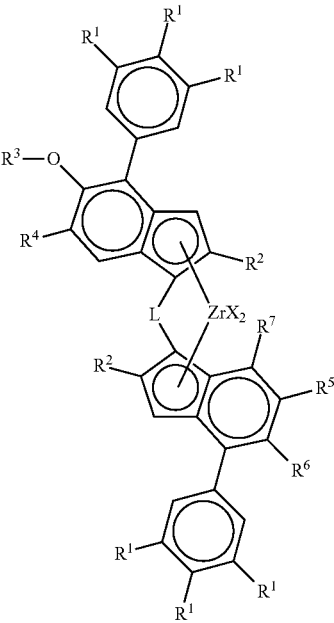

(IV)

each X independently is a sigma-donor ligand,
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom or a $C_1$-$C_{20}$-hydrocarbyl group optionally containing one or more heteroatoms of Group 14-16 of the periodic table or fluorine atoms, or optionally two R' groups taken together can form a ring, each $R^1$ are independently the same or can be different and are hydrogen, a linear or branched $C_1$-$C_6$-alkyl group, a $C_{7-20}$ arylalkyl, $C_{7-20}$ alkylaryl group or $C_{6-20}$ aryl group or an OY group, wherein Y is a $C_{1-10}$ hydrocarbyl group, and optionally two adjacent $R^1$ groups can be part of a ring including the phenyl carbons to which they are bonded, each $R^2$ independently are the same or can be different and are a $CH_2$—$R^8$ group, with $R^8$ being H or linear or branched $C_{1-6}$-alkyl group, $C_{3-8}$ cycloalkyl group, $C_{6-10}$ aryl group, $R^3$ is a linear or branched $C_1$-$C_6$-alkyl group, $C_{7-20}$ arylalkyl, $C_{7-20}$ alkylaryl group or $C_6$-$C_{20}$-aryl group, $R^4$ is a $C(R^9)3$ group, with $R^9$ being a linear or branched $C_1$-$C_6$ alkyl group, $R^5$ is hydrogen or an aliphatic $C_1$-$C_{20}$ hydrocarbyl group optionally containing one or more heteroatoms from groups 14-16 of the periodic table of elements;

$R^6$ is hydrogen or an aliphatic $C_1$-$C_{20}$ hydrocarbyl group optionally containing one or more heteroatoms from groups 14-16 of the periodic table of elements; or $R^5$ and $R^6$ can be taken together to form a 5 membered saturated carbon ring which is optionally substituted by n groups $R_{10}$, n being from 0 to 4;

each $R^{10}$ is same or different and may be a $C_1$-$C_{20}$ hydrocarbyl group, or a $C_1$-$C_{20}$ hydrocarbyl radical optionally containing one or more heteroatoms belonging to groups 14-16 of the periodic table of elements;

$R^7$ is a linear or branched $C_1$-$C_6$-alkyl group or an aryl or heteroaryl group having 6 to 20 carbon atoms optionally substituted by one to 3 groups $R^{11}$, each $R^{11}$ are independently the same or can be different and are hydrogen, a linear or branched $C_1$-$C_6$-alkyl group, a $C_{7-20}$ arylalkyl, $C_{7-20}$ alkylaryl group or $C_{6-20}$ aryl group or an OY group, wherein Y is a $C_{1-10}$ hydrocarbyl group.

In a more preferred embodiment, the metallocene complex may be of formula (V)

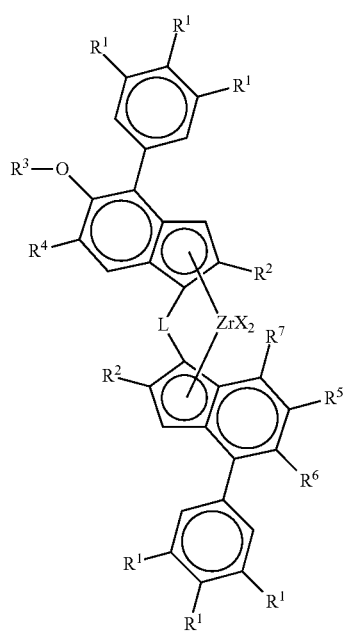

(V)

each X independently is a sigma-donor ligand,

L is a divalent bridge selected from —$R'_2C$—, or —$R'_2Si$—, wherein each R' is independently a hydrogen atom or a $C_1$-$C_{20}$-hydrocarbyl group optionally containing one or more heteroatoms of Group 14-16 of the periodic table or fluorine atoms, or optionally two R' groups taken together can form a ring, each $R^1$ are independently the same or can be different and are hydrogen, a linear or branched $C_1$-$C_6$-alkyl group, a $C_{7-20}$ arylalkyl, $C_{7-20}$ alkylaryl group or $C_{6-20}$ aryl group or an OY group, wherein Y is a $C_{1-10}$ hydrocarbyl group, and optionally two adjacent $R^1$ groups can be part of a ring including the phenyl carbons to which they are bonded, each $R^2$ independently are the same or can be different and are a $CH_2$—$R^8$ group, with $R^8$ being H or linear or branched $C_{1-6}$-alkyl group, $C_{3-8}$ cycloalkyl group, $C_{6-10}$ aryl group, $R^3$ is a linear or branched $C_1$-$C_6$-alkyl group, $C_{7-20}$ arylalkyl, $C_{7-20}$ alkylaryl group or $C_6$-$C_{20}$-aryl group, $R^4$ is a $C(R^9)3$ group, with $R^9$ being a linear or branched $C_1$-$C_6$ alkyl group, $R^5$ is hydrogen;

$R^6$ is hydrogen; or $R^5$ and $R^6$ can be taken together to form a 5 membered saturated carbon ring which is optionally substituted by n groups $R^{10}$, n being from 0 to 4;

each $R^{10}$ is same or different and may be a $C_1$-$C_{20}$ hydrocarbyl group, or a $C_1$-$C_{20}$ hydrocarbyl radical optionally containing one or more heteroatoms belonging to groups 14-16 of the periodic table of elements;

$R^7$ is a linear or branched $C_1$-$C_6$-alkyl group or an aryl optionally substituted by one to 3 groups $R^{11}$, each $R^{11}$ are independently the same or can be different and are hydrogen, a linear or branched $C_1$-$C_6$-alkyl group, a $C_{7-20}$ arylalkyl, $C_{7-20}$ alkylaryl group or $C_{6-20}$ aryl group or an OY group, wherein Y is a $C_{1-10}$ hydrocarbyl group.

In a more preferred embodiment, the metallocene complex may be of formula (VI)

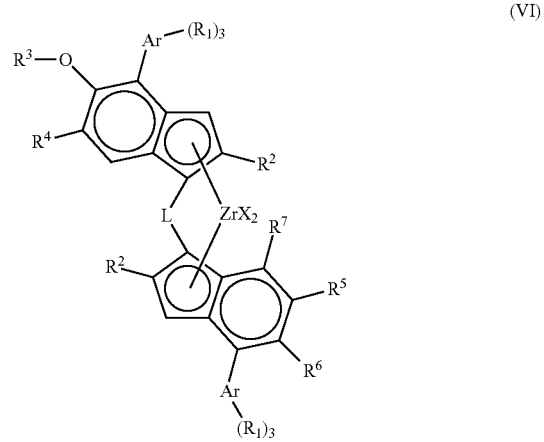

(VI)

each X independently is a sigma-donor ligand,

L is a divalent bridge selected from —$R'_2C$—, or —$R'_2Si$—; wherein each R' is independently a $C_1$-$C_6$-alkyl, $C_{5-6}$-cycloalkyl, $C_{1-10}$-alkyl-O—$C_{1-10}$ alkyl or $C_6$-aryl group;

each Ar is a phenyl ring or a 5 or 6 membered heteroaryl ring;

each $R^1$ are independently the same or can be different and are hydrogen, a linear or branched $C_1$-$C_6$-alkyl group, each $R^2$ independently are the same or can be different and are a CHR$^{8'}$—$R^8$ group, with $R^8$ being H or linear or branched $C_{1-6}$-alkyl group, and $R^{8'}$ is H or a $C_{1-6}$ alkyl;

$R^3$ is a linear or branched $C_1$-$C_6$-alkyl group, $C_{7-20}$-arylalkyl, $C_{7-20}$-alkylaryl group or $C_6$-$C_{20}$-aryl group;

$R^4$ is a $C(R^9)_3$ group, with $R^9$ being a linear or branched $C_1$-$C_6$-alkyl group;

$R^5$ is hydrogen;

$R^6$ is hydrogen; or $R^5$ and $R^6$ can be taken together to form a 5 membered saturated carbon ring;

$R^7$ is a linear or branched $C_1$-$C_6$-alkyl group or an aryl or heteroaryl group having 3 to 20 carbon atoms optionally substituted by one to three groups $R^{11}$, such as a phenyl ring or a 5 or 6 membered heteroaryl ring optionally substituted by one to three groups $R^{11}$; and each $R^{11}$ are independently the same or can be different and are hydrogen, a linear or branched $C_1$-$C_6$-alkyl group.

In a more preferred embodiment, the metallocene complex may be of formula (VII)

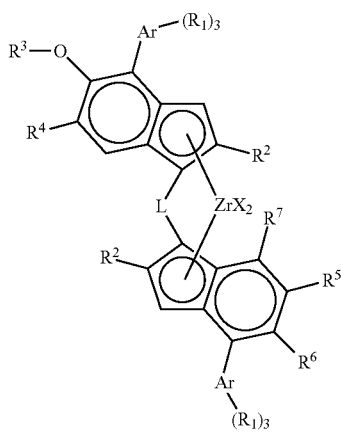

(VII)

each X independently is a sigma-donor ligand,

L is a divalent bridge selected from —R'$_2$C—, or —R'$_2$Si—; wherein each R' is independently a $C_1$-$C_6$-alkyl, $C_{5-6}$-cycloalkyl, $C_{1-10}$-alkyl-O—$C_{1-10}$ alkyl or $C_6$-aryl group;

each Ar is a phenyl ring or a 5 or 6 membered heteroaryl ring;

each $R^1$ are independently the same or can be different and are hydrogen, a linear or branched $C_1$-$C_6$-alkyl group, each $R^2$ independently are the same or can be different and are a CHR$^{8'}$—$R^8$ group, with $R^8$ being H or linear or branched $C_{1-6}$-alkyl group, and $R^{8'}$ is H or a $C_{1-6}$ alkyl;

$R^3$ is a linear or branched $C_1$-$C_6$-alkyl group;

$R^4$ is a $C(R^9)_3$ group, with $R^9$ being a linear or branched $C_1$-$C_6$-alkyl group;

$R^5$ and $R^6$ can be taken together to form a 5 membered saturated carbon ring;

$R^7$ is a phenyl ring or a 5 or 6 membered heteroaryl ring optionally substituted by one to three groups $R^{11}$; and each $R^{11}$ are independently the same or can be different and are hydrogen, a linear or branched $C_1$-$C_6$-alkyl group.

In a more preferred embodiment, the metallocene complex may be of formula (VIII)

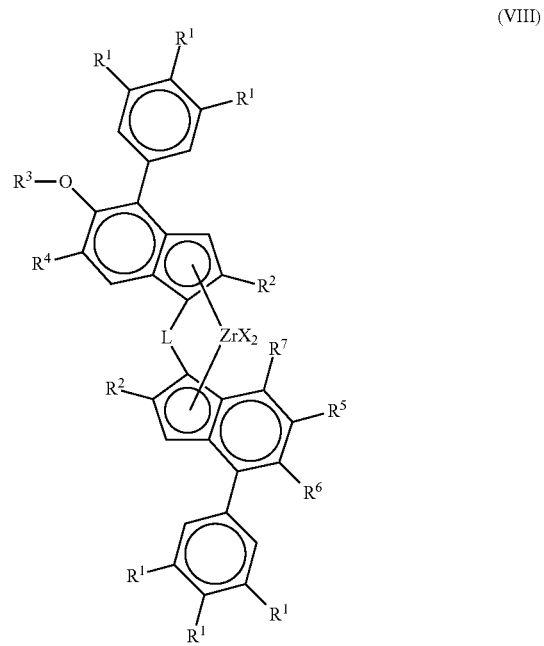

(VIII)

each X independently is a sigma-donor ligand,

L is a divalent bridge selected from —R'$_2$C—, or —R'$_2$Si—; wherein each R' is independently a $C_1$-$C_6$-alkyl, $C_{1-6}$cycloalkyl, $C_{1-10}$-alkyl-O—$C_{1-10}$ alkyl or $C_6$-aryl group;

each $R^1$ are independently the same or can be different and are hydrogen, a linear or branched $C_1$-$C_6$-alkyl group;

each $R^2$ independently are the same or can be different and are a CH$_2$—$R^8$ group, with $R^8$ being H or linear or branched $C_{1-6}$-alkyl group, $R^3$ is a linear or branched $C_1$-$C_6$-alkyl group, $R^4$ is a $C(R^9)$3 group, with $R^9$ being a linear or branched $C_1$-$C_6$ alkyl group, $R^5$ is hydrogen;

$R^6$ is hydrogen; or $R^5$ and $R^6$ can be taken together to form a 5 membered saturated carbon ring;

$R^7$ is a phenyl group optionally substituted by one to 3 groups $R^{11}$, each $R^{11}$ are independently the same or can be different and are hydrogen, a linear or branched $C_1$-$C_6$-alkyl group.

In a more preferred embodiment, the metallocene complex may be of formula (IX)

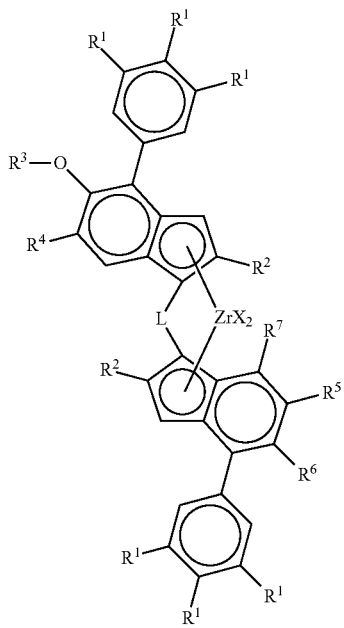

(IX)

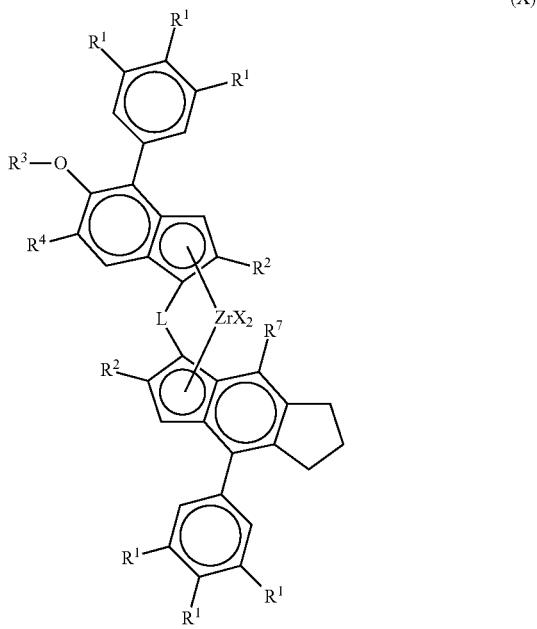

(X)

each X independently is a sigma-donor ligand,

L is —R'$_2$Si—; wherein each R' is independently a C$_1$-C$_6$-alkyl, C$_{5-6}$-cycloalkyl, C$_{1-10}$-alkyl-O—C$_{1-10}$ alkyl or C$_6$-aryl group;

each R$^1$ are independently the same or can be different and are hydrogen, a linear or branched C$_1$-C$_6$-alkyl group;

each R$^2$ is methyl;

R$^3$ is a linear or branched C$_1$-C$_6$-alkyl group,

R$^4$ is a C(R$^9$)3 group, with R$^9$ being a linear or branched C$_1$-C$_6$ alkyl group, R$^5$ is hydrogen;

R$^6$ is hydrogen; or

R$^5$ and R$^6$ can be taken together to form a 5 membered saturated carbon ring;

R$^7$ is a phenyl group optionally substituted by one to 3 groups R$^{11}$, each R$^{11}$ are independently the same or can be different and are hydrogen, a linear or branched C$_1$-C$_6$-alkyl group.

In a more preferred embodiment, the metallocene complex may be of formula (X)

each X independently is a sigma-donor ligand,

L is a —R'$_2$Si—; wherein each R' is independently a C$_1$-C$_6$-alkyl, C$_{5-6}$-cycloalkyl, C$_{1-10}$-alkyl-O—C$_{1-10}$ alkyl or C$_6$-aryl group;

each R$^1$ are independently the same or can be different and are hydrogen, a linear or branched C$_1$-C$_6$-alkyl group;

each R$^2$ independently are the same or can be different and are a CH$_2$—R$^8$ group, with R$^8$ being H or linear or branched C$_{1-6}$-alkyl group;

R$^3$ is a linear or branched C$_1$-C$_6$-alkyl group,

R$^4$ is a C(R$^9$)3 group, with R$^9$ being a linear or branched C$_1$-C$_6$ alkyl group, R$^7$ is a phenyl group optionally substituted by one to 3 groups R$^{11}$, each R$^{11}$ are independently the same or can be different and are hydrogen, a linear or branched C$_1$-C$_6$-alkyl group.

In a more preferred embodiment, the metallocene complex may be of formula (XI)

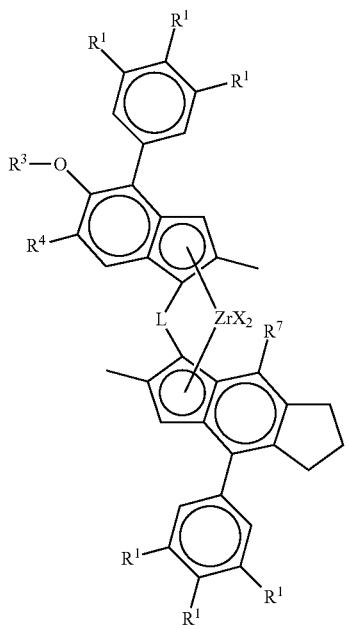 (XI)

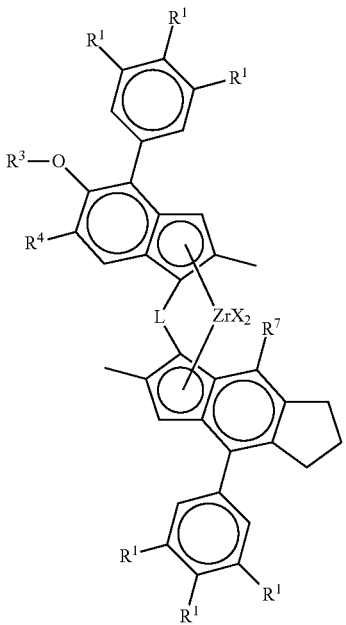 (XII)

each X independently is a sigma-donor ligand such as a halogen atom, a linear or branched $C_{1-4}$-alkyl or $C_{1-4}$-alkoxy group, a phenyl or benzyl group, L is $—R'_2Si—$; wherein each R is independently a $C_1$-$C_6$-alkyl, $C_{5-6}$-cycloalkyl, $C_{1-10}$-alkyl-O—$C_{1-10}$ alkyl or $C_6$-aryl group;

each $R^1$ are independently the same or can be different and are hydrogen, a linear or branched $C_1$-$C_6$-alkyl group;

$R^3$ is a linear or branched $C_1$-$C_6$-alkyl group, $R^4$ is a $C(R^9)3$ group, with $R^9$ being a linear or branched $C_1$-$C_6$ alkyl group, $R^7$ is a phenyl group optionally substituted by one to 3 groups $R^{11}$, each $R^{11}$ are independently the same or can be different and are hydrogen, a linear or branched $C_1$-$C_6$-alkyl group.

In a more preferred embodiment, the metallocene complex may be of formula (XII)

each X independently is a sigma-donor ligand such as a halogen atom, a linear or branched $C_{1-4}$-alkyl or $C_{1-4}$-alkoxy group, a phenyl or benzyl group, L is -Me$_2$Si—, each $R^1$ are independently the same or can be different and are hydrogen, a linear or branched $C_1$-$C_6$-alkyl group;

$R^3$ is a linear or branched $C_1$-$C_6$-alkyl group, $R^4$ is a $C(R^9)3$ group, with $R^9$ being a linear or branched $C_1$-$C_6$ alkyl group, $R^7$ is a phenyl group optionally substituted by one to 3 groups $R^{11}$, each $R^{11}$ are independently the same or can be different and are hydrogen, a linear or branched $C_1$-$C_6$-alkyl group.

In a one embodiment, the metallocene complex may be of formula (XIII)

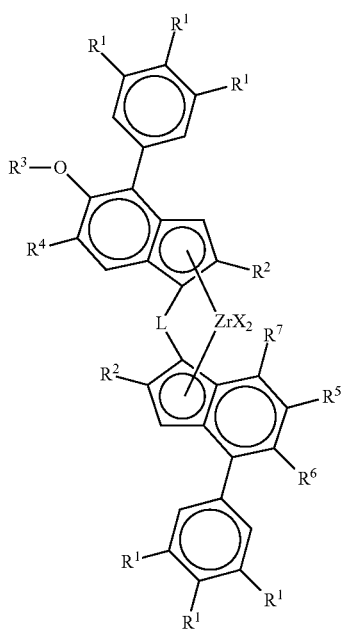

(XIII)

each X independently is a sigma-donor ligand,
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom or a C$_1$-C$_{20}$-hydrocarbyl group optionally containing one or more heteroatoms of Group 14-16 of the periodic table or fluorine atoms, or optionally two R' groups taken together can form a ring,
each R$^1$ are independently the same or can be different and are hydrogen, a linear or branched C$_1$-C$_6$-alkyl group, a C$_{7-20}$ arylalkyl, C$_{7-20}$ alkylaryl group or C$_{6-20}$ aryl group or an OY group, wherein Y is a C$_{1-10}$ hydrocarbyl group, and optionally two adjacent R$^1$ groups can be part of a ring including the phenyl carbons to which they are bonded,
each R$^2$ independently are the same or can be different and are a CH$_2$—R$^8$ group, with R$^8$ being H or linear or branched C$_{1-6}$-alkyl group, C$_{3-8}$ cycloalkyl group, C$_{6-10}$ aryl group,
R$^3$ is a linear or branched C$_1$-C$_6$-alkyl group, C$_{7-20}$ arylalkyl, C$_{7-20}$ alkylaryl group or C$_6$-C$_{20}$-aryl group,
R$^4$ is a C(R$^9$)3 group, with R$^9$ being a linear or branched C$_1$-C$_6$ alkyl group,
R$^5$ and R$^6$ can be taken together to form a 5 membered saturated carbon ring which is optionally substituted by n groups R$^{10}$, n being from 0 to 4;
each R$^{10}$ is same or different and may be a C$_1$-C$_{20}$ hydrocarbyl group, or a C$_1$-C$_{20}$ hydrocarbyl radical optionally containing one or more heteroatoms belonging to groups 14-16 of the periodic table of elements; and
R$^7$ is H;
in particular where
each X independently is a sigma-donor ligand such as a halogen atom, a linear or branched C$_{1-4}$-alkyl or C$_{1-4}$-alkoxy group, a phenyl or benzyl group,
L is -Me$_2$Si—,
each R$^1$ are independently the same or can be different and are hydrogen, a linear or branched C$_1$-C$_6$-alkyl group;
R$^3$ is a linear or branched C$_1$-C$_6$-alkyl group,
R$^4$ is a C(R$^9$)3 group, with R$^9$ being a linear or branched C$_1$-C$_6$ alkyl group,
R$^7$ is H.

Particular complexes of the invention include:
rac-dimethylsilanediylbis[2-methyl-4-(3',5'-dimethylphenyl)-5-methoxy-6-tert-butylinden-1-yl]zirconium dichloride,
rac-anti-dimethylsilanediyl[2-methyl-4-(4'-tert-butylphenyl)-inden-1-yl][2-methyl-4-(4'-tert-butylphenyl)-5-methoxy-6-tert-butylinden-1-yl]zirconium dichloride,
rac-anti-dimethylsilanediyl[2-methyl-4-(4'-tert-butylphenyl)-inden-1-yl][2-methyl-4-phenyl-5-methoxy-6-tert-butylinden-1-yl]zirconium dichloride,
rac-anti-dimethylsilanediyl[2-methyl-4-(3',5'-tert-butylphenyl)-1,5,6,7-tetrahydro-s-indacen-1-yl][2-methyl-4-(3',5'-dimethyl-phenyl)-5-methoxy-6-tert-butylinden-1-yl]zirconium dichloride,
rac-anti-dimethylsilanediyl[2-methyl-4,8-bis-(4'-tert-butylphenyl)-1,5,6,7-tetrahydro-s-indacen-1-yl][2-methyl-4-(3',5'-dimethyl-phenyl)-5-methoxy-6-tert-butylinden-1-yl]zirconium dichloride,
rac-anti-dimethylsilanediyl[2-methyl-4,8-bis-(3',5'-dimethylphenyl)-1,5,6,7-tetrahydro-s indacen-1-yl][2-methyl-4-(3',5'-dimethylphenyl)-5-methoxy-6-tert-butylinden-1-yl]zirconium dichloride,
rac-anti-dimethylsilanediyl[2-methyl-4,8-bis-(3',5'-dimethylphenyl)-1,5,6,7-tetrahydro-s-indacen-1-yl][2-methyl-4-(3',5'-ditert-butyl-phenyl)-5-methoxy-6-tert-butylinden-1-yl]zirconium dichloride.

For the avoidance of doubt, any narrower definition of a substituent offered above can be combined with any other broad or narrowed definition of any other substituent.

Throughout the disclosure above, where a narrower definition of a substituent is presented, that narrower definition is deemed disclosed in conjunction with all broader and narrower definitions of other substituents in the application.

The ligands required to form the complexes and hence catalysts of the invention can be synthesised by any process and the skilled organic chemist would be able to devise various synthetic protocols for the manufacture of the necessary ligand materials. For Example WO2007/116034 discloses the necessary chemistry. Synthetic protocols can also generally be found in WO2002/02576, WO2011/135004, WO2012/084961, WO2012/001052, WO2011/076780, WO2015/158790 and WO2018/122134. The examples section also provides the skilled person with sufficient direction.

Cocatalyst

To form an active catalytic species it is normally necessary to employ a cocatalyst as is well known in the art.

According to the present invention a cocatalyst system comprising a boron containing cocatalyst and an aluminoxane cocatalyst is used in combination with the above defined metallocene catalyst complex.

The aluminoxane cocatalyst can be one of formula (A):

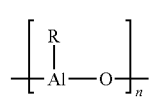

(A)

where n is from 6 to 20 and R has the meaning below.

Aluminoxanes are formed on partial hydrolysis of organoaluminum compounds, for example those of the formula AlR$_3$, AlR$_2$Y and Al$_2$R$_3$Y$_3$ where R can be, for example, C$_1$-C$_{10}$-alkyl, preferably C$_1$-C$_5$-alkyl, or C$_3$-C$_{10}$-cycloalkyl, $C_7$-$C_{12}$-arylalkyl or -alkylaryl and/or phenyl or naphthyl, and where Y can be hydrogen, halogen, preferably chlorine or bromine, or $C_1$-$C_{10}$-alkoxy, preferably methoxy or ethoxy. The resulting oxygen-containing aluminoxanes are not in general pure compounds but mixtures of oligomers of the formula (II).

The preferred aluminoxane is methylaluminoxane (MAO). Since the aluminoxanes used according to the invention as cocatalysts are not, owing to their mode of preparation, pure compounds, the molarity of aluminoxane solutions hereinafter is based on their aluminium content.

According to the present invention, also a boron containing cocatalyst is used in combination with the aluminoxane cocatalyst.

Boron containing cocatalysts of interest include those of formula (B)

$$BY_3 \quad (B)$$

wherein Y is the same or different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine. Preferred examples for Y are fluorine, trifluoromethyl, aromatic fluorinated groups such as p-fluorophenyl, 3,5-difluorophenyl, pentafluorophenyl, 3,4,5-trifluorophenyl and 3,5-di(trifluoromethyl)phenyl. Preferred options for $BY_3$ are trifluoroborane, tris(4-fluorophenyl)borane, tris(3,5-difluorophenyl)borane, tris(4-fluoromethylphenyl)borane, tris(2,4,6-trifluorophenyl)borane, tris(penta-fluorophenyl)borane, tris(3,5-difluorophenyl)borane, tris(3,5-di(trifluoromethyl)phenyl)borane and/or tris (3,4,5-trifluorophenyl)borane.

Particular preference is given to tris(pentafluorophenyl) borane.

However it is preferred that borates are used. These compounds generally contain an anion of formula C):

$$(Z)_4B^- \quad (C)$$

where Z is an optionally substituted phenyl derivative, said substituent being a halo-$C_{1-6}$-alkyl or halo group. Preferred options are fluoro or trifluoromethyl. Most preferably, the phenyl group is perfluorinated.

Such ionic cocatalysts preferably contain a weakly coordinating anion such as tetrakis(pentafluorophenyl)borate or tetrakis(3,5-di(trifluoromethyl)phenyl)borate.

Suitable cationic counterions include triphenylcarbenium and protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N,N-dimethylanilinium.

Preferred ionic compounds which can be used according to the present invention include: tributylammoniumtetrakis(pentafluorophenyl)borate, tributylammoniumtetrakis(trifluoromethylphenyl)borate, tributylammoniumtetrakis(4-fluorophenyl)borate, N,N-dimethylcyclohexylammoniumtetrakis(pentafluorophenyl) borate, N,N-dimethylbenzylammoniumtetrakis (pentafluorophenyl)borate, N,N-dimethylaniliniumtetrakis (pentafluorophenyl)borate, N,N-di(propyl) ammoniumtetrakis(pentafluorophenyl)borate, di(cyclohexyl)ammoniumtetrakist(pentafluorophenyl)borate, triphenylcarbeniumtetrakis(pentafluorophenyl)borate or ferroceniumtetrakis(pentafluorophenyl)borate.

Preference is given to triphenylcarbeniumtetrakis(pentafluorophenyl) borate, N,N-dimethylaniliniumtetrakis(pentafluorophenyl)borate, N,N-dimethylcyclohexylammoniumtetrakis(pentafluorophenyl)borate or N,N-dimethylbenzylammoniumtetrakis(pentafluorophenyl) borate.

It has been surprisingly found that certain boron containing cocatalysts are especially preferred. Preferred borates of use in the invention therefore comprise the trityl, i.e. triphenylcarbenium, ion. Thus the use of $Ph_3CB(PhF_5)_4$ and analogues therefore are especially favoured.

Suitable amounts of cocatalyst will be well known to the skilled man.

The molar ratio of feed amounts of boron to the zirconium ion of the metallocene may be in the range 0.1:1 to 10:1 mol/mol, preferably 0.3:1 to 7:1, especially 0.3:1 to 5:1 mol/mol.

Even more preferably, the molar ratio of feed amounts of boron to the zirconium ion of the metallocene B/Zr is from 0.3:1 to 3:1.

The catalyst can contain from 10 to 100 µmol of zirconium per gram of silica/support, and 5 to 10 mmol of Al per gram of silica/support.

The molar ratio of Al in the aluminoxane to the zirconium ion of the metallocene may be in the range 1:1 to 2000:1 mol/mol, preferably 10:1 to 1000:1, and more preferably 50:1 to 600:1 mol/mol.

Catalyst System

The metallocene complex as described above is used in combination with a suitable cocatalyst combination as described above as a catalyst.

The catalyst system of the invention is used in supported form. The particulate support material used is a porous inorganic support such as silica, alumina or a mixed oxide such as silica-alumina, in particular silica.

The use of a silica support is preferred. The skilled man is aware of the procedures required to support a metallocene catalyst.

Especially preferably the support is a porous material so that the complex may be loaded into the pores of the support, e.g. using a process analogous to those described in WO94/14856, WO95/12622, WO2006/097497 and EP1828266.

The average particle size of the support such as silica support can be typically from 10 to 100 µm. However, it has turned out that special advantages can be obtained if the support has an average particle size from 15 to 80 µm, preferably from 18 to 50 µm.

The average pore size of the support such as silica support can be in the range 10 to 100 nm and the pore volume from 1 to 3 mL/g.

Examples of suitable support materials are, for instance, ES757 produced and marketed by PQ Corporation, Sylopol 948 produced and marketed by Grace or SUNSPERA DM-L-303 silica produced by AGC Si-Tech Co.

Supports can be optionally calcined prior to the use in catalyst preparation in order to reach optimal silanol group content. The use of these supports is routine in the art.

Preparation of the Catalyst System

There are several ways to produce the catalyst system according to the present invention. In one embodiment, the preparation of the catalyst system according to the present invention comprises the steps of:
a) reacting the support such as silica support with aluminoxane cocatalyst in a suitable hydrocarbon solvent, such as toluene with optional subsequent drying, to obtain aluminoxane cocatalyst treated support, b) reacting metallocene complex of formula (I) with aluminoxane cocatalyst in a suitable hydrocarbon solvent, such as toluene, c) adding borate cocatalyst to the solution obtained in step b) to obtain a solution of metallocene complex of formula (I), borate cocatalyst and aluminoxane cocatalyst whereby the borate cocatalyst is added in an amount that a boron/zirconium molar ratio of feed amounts in the range of 0.1:1 to 10:1 is reached, d) adding the solution obtained in step c) to the aluminoxane cocatalyst treated support obtained in step a) wherein the amount of aluminoxane cocatalyst added in step a) is 75.0 to 97.0 wt % of the total amount of aluminoxane cocatalyst and the amount of aluminoxane cocatalyst added in step b) is 3.0 to 25.0 wt % of the total amount of aluminoxane cocatalyst; and e) drying the so obtained supported catalyst system.

Polymerization

The present invention relates in a further aspect to a process for producing a propylene homopolymer, a propylene random copolymer or a heterophasic, propylene copolymer using the specific catalyst system, as defined before.

The process for producing a propylene homopolymer and a propylene random copolymer can be a one step polymerization process, e.g. in bulk, like in a loop reactor.

Propylene homopolymer, a propylene random copolymer or a heterophasic propylene copolymer can be further produced in a multistage polymerization process.

Preferably, especially for heterophasic propylene copolymers, the process is a multistage polymerization process including a gas phase polymerization step.

Polymerization in the process of the invention preferably may be effected in at least one liquid slurry reactor, or in at least two or more, e.g. 2, 3 or 4, polymerization reactors of which at least one reactor is a gas phase reactor. The process may also involve a prepolymerization step. This prepolymerization step is a conventional step used routinely in polymer synthesis.

In one embodiment, the polymerization process for producing a propylene homopolymer or a propylene random copolymer employs one liquid slurry reactor combined with a prepolymerization reactor.

In another embodiment, especially for producing heterophasic propylene copolymers, but also propylene random copolymers, the process of the invention preferably employs two or three main reactors, provided that at least one reactor is a gas phase reactor. Ideally, the multistage process of the invention employs a first reactor operating in liquid slurry and a second and optional third reactors being gas phase reactors. The process may also utilise a prepolymerization step. Liquid slurry reactions may take place in a loop reactor.

The process using the catalysts system of the invention is ideally suited for the preparation of propylene homopolymers, propylene random copolymers or heterophasic propylene copolymers, which will be defined below in more detail. In heterophasic propylene copolymers, a homopolymer or random copolymer matrix (M) is combined with a copolymeric amorphous fraction, i.e. amorphous propylene-ethylene copolymer (A), to form the heterophasic copolymer of the invention.

According to the present invention the amorphous propylene-ethylene copolymer (A) is formed in a gas phase reactor. For the purpose of this invention, the amorphous propylene-A ethylene copolymer (A) is also referred to as ethylene-propylene rubber or EPR.

Where two gas phase reactors are employed, a first gas phase reactor may produce a homopolymer or copolymer component, ideally a homopolymer component, whereby this polymer component from such a first gas phase reactor forms part of the matrix (M) of the polymer.

For liquid slurry and gas phase copolymerization reactions, the reaction temperature used will generally be in the range 60 to 115° C. (e.g. 70 to 90° C.), the reactor pressure will generally be in the range 10 to 25 bar for gas phase reactions with liquid slurry polymerization operating at higher pressures, such as 30 to 60 bar. The residence time will generally be 0.25 to 8 hours (e.g. 0.5 to 4 hours). The gas used will be the monomer optionally as mixture with a non-reactive gas such as nitrogen or propane. It is a particular feature of the invention that polymerization takes place at temperatures of at least 60° C. For the purpose of this invention, the slurry polymerization in liquid monomer is also referred to as the bulk step.

Generally the quantity of catalyst used will depend upon the nature of the catalyst, the reactor types and conditions and the properties desired for the polymer product. As is well known in the art hydrogen can be used for controlling the molecular weight of the polymer.

Production splits between the various reactors can vary. When two reactors are used, splits are generally in the range of 30 to 70 wt % to 70 to 30 wt % bulk to gas phase, preferably 40 to 60 to 60 to 40 wt %. Where three reactors are used, it is preferred that each reactor preferably produces at least 20 wt % of the polymer, such as at least 25 wt %. The sum of the polymer produced in gas phase reactors should preferably exceed the amount produced in the bulk step. Values might be 30 to 45 wt % in bulk and 70 to 55 wt % in gas phase reactors.

The metallocene catalyst system of the invention possesses excellent catalyst activity and good comonomer response.

The catalyst system is also able to provide polymers of high weight average molecular weight Mw.

In addition, the catalyst system of the present invention, especially catalyst systems containing MAO and borate cocatalysts, shows higher productivity, especially in the production of polypropylene copolymers with ethylene, compared to catalyst systems without borate cocatalyst. This effect surprisingly increases with the amount of ethylene added and can be expressed by the inequation (1):

$$\Delta \text{ productivity } [kgPP/gcat] > 10 \times C2 \text{ [wt \%]}.$$

Δproductivity is the difference between the productivity of the metallocene-MAO-borate catalyst and the productivity of the metallocene-MAO catalyst at a given ethylene concentration in the monomer feed in propylene-ethylene copolymerizations performed under strictly comparable, i.e. under the same, conditions. C2 wt % is the amount of ethylene in the polymer.

It is furthermore preferred if the catalyst system of the invention is used in the manufacture of heterophasic PP/EPR blends. These reactor blends may be produced in two-steps (homopolypropylene (hPP) in bulk+ethylene-propylene rubber in gas phase) or three steps (hPP in bulk+hPP in gas phase+EPR in gas phase).

Thus, viewed from this aspect the invention provides a process for the preparation of a heterophasic polypropylene copolymer comprising:

(I) polymerizing propylene in bulk in the presence of a catalyst system as herein defined to form a polypropylene homopolymer matrix;

(II) in the presence of said matrix and said catalyst system and in the gas phase, polymerizing propylene and ethylene to form a heterophasic polypropylene copolymer comprising a homopolymer matrix and an ethylene propylene rubber, respectively an amorphous propylene copolymer (A).

Viewed from another aspect the invention provides a process for the preparation of a heterophasic polypropylene copolymer comprising:

(I) polymerizing propylene in bulk in the presence of a catalyst system as herein defined to form a polypropylene homopolymer;

(II) in the presence of said homopolymer and said catalyst system and in the gas phase, polymerizing propylene to form a polypropylene homopolymer matrix;

(III) in the presence said matrix and said catalyst system and in the gas phase, polymerizing propylene and ethylene to form a heterophasic polypropylene copolymer comprising a homopolymer matrix and an ethylene propylene rubber (EPR), respectively an amorphous propylene copolymer (A).

Polymers

It is a feature of the invention that the claimed catalyst system enables the formation of propylene random copolymers with higher productivity.

The Mw of the random polymers made using the catalysts of the invention may exceed 200,000, preferably at least 220,000, e.g. at least 240,000. Values of more than 320,000 have also been achieved. Mw/Mn values of the copolymers produced in a single reactor are generally low, e.g. less than 4, such as less than 3.5 or even less than 3.3.

Propylene random copolymers made by the catalyst system of the invention can be made with $MFR_2$ values in the range of 0.1 to 100 g/10 min depending on the amount of comonomer and/or use and amount of hydrogen used as MFR regulating agent. ($MFR_2$ measured according to ISO1133, 230° C./2.16 kg load). Given the very high molecular weight capability of the present catalysts, the $MFR_2$, the Mw and the Mw/Mn values of the copolymers can be broadened at will by using multiple reactors, in which temperature, pressure and H2 concentration can be varied within the process windows.

It is a further feature of the invention that the claimed catalyst system enables the formation of heterophasic copolymers with a rubber phase with high molecular weight.

Thus, viewed from another aspect the invention provides the use in olefin polymerization of a catalyst system as hereinbefore defined, for the formation of a heterophasic propylene copolymer comprising a matrix polypropylene homopolymer and an amorphous propylene copolymer (A), respectively ethylene-propylene rubber, dispersed in said matrix (M), wherein the heterophasic polypropylene copolymer is characterized by (a1) 30.0 to 85.0 wt % of a crystalline fraction (CF) and
(a2) 15.0 to 70.0 wt % of a soluble fraction (SF) having an ethylene content of 15.0 to 80.0 wt % and an intrinsic viscosity (in decaline at 135° C.) of 2.0 to 5.0 dl/g, wherein the crystalline fraction (CF) and the soluble fraction (SF) are determined in 1,2,4-trichlorobenzene at 40° C.

Such heterophasic propylene copolymers (HECOs) comprise a semicrystalline polymer matrix (M) being a propylene homopolymer (hPP) or a semicrystalline random propylene-ethylene or propylene-butene copolymer (rPP) or a combination of the two, in which a mostly amorphous copolymer (A), like a propylene-ethylene copolymer (EP), is dispersed (rubber phase, or EPR).

Thus, the polypropylene matrix (M) contains (finely) dispersed inclusions being not part of the matrix and said inclusions contain the amorphous copolymer (A).

The term "heterophasic polypropylene copolymer" used herein denotes copolymers consisting of a matrix resin, being a polypropylene homopolymer or a propylene copolymer and a predominantly amorphous copolymer (A) dispersed in said matrix resin, as defined in more detail below.

In the present invention, the term "matrix" is to be interpreted in its commonly accepted meaning, i.e. it refers to a continuous phase (in the present invention a continuous polymer phase) in which isolated or discrete particles such as rubber particles may be dispersed. The propylene polymer is present in such an amount that it forms a continuous phase which can act as a matrix.

Furthermore the terms "amorphous copolymer", "dispersed phase", "predominantly amorphous copolymer" and "rubber phase" denote the same, i.e. are interchangeable in the present invention. Amorphous means that the copolymer, when analysed by DSC as a pure component (after having been extracted from the matrix by xylene extraction), has a heat of fusion of less than 20 J/g.

Matrix (M):

The matrix (M) of the particular heterophasic polypropylene copolymer is a propylene homopolymer or a semicrystalline propylene-ethylene or propylene-butene copolymer or a combination of the two. The term "semicrystalline" indicates that the copolymer has a well-defined melting point and a heat of fusion higher than 50 J/g.

The expression homopolymer used in the instant invention relates to a polypropylene that consists substantially, i.e. of at least 97.0 wt %, preferably of at least 98.0 wt %, more preferably of at least 99.0 wt %, still more preferably of at least 99.8 wt % of propylene units. In a preferred embodiment, only propylene units in the propylene homopolymer are detectable.

In one embodiment the matrix (M) comprises the homopolymer of propylene as defined above or below, preferably consists of the homopolymer of propylene as defined above or below.

The polypropylene homopolymer may comprise or consist of a single polypropylene homopolymer fraction (=unimodal), but may also comprise a mixture of different polypropylene homopolymer fractions.

In cases where the polypropylene homopolymer comprises different fractions, the polypropylene homopolymer is understood to be bi- or multimodal.

These fractions may have different average molecular weight or different molecular weight distribution.

It is preferred that the polypropylene homopolymer can be bimodal or multimodal in view of molecular weight or molecular weight distribution.

It is alternatively preferred that the polypropylene homopolymer can be unimodal in view of average molecular weight and/or molecular weight distribution.

Thus in one embodiment or the present invention the matrix (M) is unimodal, whereas in another embodiment the matrix (M) is bimodal and consists of two propylene homopolymer fractions (hPP-1) and (hPP-2)

In a further embodiment, the matrix (M) is bimodal and consists of one homopolymer fraction and one semicrystalline copolymer fraction.

Amorphous Propylene Copolymer (A)):

The second component of the particular heterophasic polypropylene copolymer is the propylene copolymer (A), which is an amorphous copolymer of propylene and ethylene.

Thus, the second component an electromeric copolymer, being dispersed in said matrix (M) (i.e. dispersed phase).

As stated above, the terms "amorphous (propylene-ethylene) copolymer", "dispersed phase" and "rubber phase" denote the same, i.e. are interchangeable in view of this invention.

The amorphous propylene-ethylene copolymer (A) is fully soluble in xylene at room temperature.

Like the propylene polymer matrix, the dispersed phase can be unimodal or multimodal, like bimodal.

In one embodiment, the dispersed phase is unimodal. More particularly, the dispersed phase is preferably unimodal with respect to the intrinsic viscosity and/or the comonomer distribution.

Concerning the definition of unimodal and multimodal, like bimodal, it is referred to the definition above.

Preferably, the unimodal dispersed phase is made in one reaction stage, more preferably in a gas phase reactor ad comprises, respectively consists of one propylene-ethylene copolymer fraction.

Final Heterophasic Propylene Copolymer

The heterophasic propylene copolymer according to the present invention is, as described above, produced by sequential polymerization wherein in at least one step the propylene homopolymer matrix is produced, and in a subsequent step the amorphous propylene-ethylene copolymer (A) is produced in the presence of the propylene homopolymer.

In order to characterize the matrix phase and the amorphous phase of a heterophasic propylene copolymer several methods are known.

One method is the extraction of a xylene cold solubles (XCS) fraction, thus separating a xylene cold solubles (XCS) fraction from a xylene cold insoluble (XCI) fraction. It is known that the xylene cold solubles (XCS) fraction of a heterophasic propylene copolymer largely corresponds to the amorphous phase. It may, however, contain small parts of the matrix phase, e.g. around 1.0 wt %. The xylene extraction is especially suitable for heterophasic polypropylene compositions with a highly crystalline matrix phase such as propylene homopolymer matrix phase.

The heterophasic propylene copolymer has a total xylene soluble (XCS) fraction (determined according to ISO 16152 at 25° C.) in the range of from 15.0 to 70.0 wt %, preferably in the range of from 20.0 to 60.0 wt %.

Another method is the separation of a crystalline fraction and a soluble fraction with the CRYSTEX QC method using 1,2,4-trichlorobenzene (TCB) as solvent. This method is described below in the measurement methods section. In this method, a crystalline fraction (CF) and a soluble fraction (SF) are separated from each other. The crystalline fraction (CF) largely corresponds to the matrix phase and contains only a small part of the elastomeric phase, while the soluble fraction (SF) largely corresponds to the elastomeric phase and contains only a small part of the matrix phase.

Due to the differences in the separation methods using extraction by xylene and by 1,2,4-trichlorobenzene, the properties of XCS/XCI fractions on the one hand and soluble/crystalline (SF/CF) fractions on the other hand are not exactly the same, but are similar.

As indicated above, the heterophasic propylene copolymer according to the present invention is characterized by a soluble fraction (SF) determined in 1,2,4-trichlorobenzene at 40° C. in the range of 15.0 to 70.0 wt %, based on the total weight of the heterophasic propylene copolymer, and the soluble fraction (SF) has an ethylene content C2(SF) in the range of 15.0 to 80.0 wt % and an intrinsic viscosity of 2.0 to 5.0 dl/g Preferably, the amount of the soluble fraction (SF) of the heterophasic propylene copolymer is 20.0 wt % to 50.0 wt %.

Preferably, the soluble fraction (SF) has an ethylene content C2(SF) in the range of 18.0 to 60 wt %, more preferably in the range of 20.0 to 50 wt %.

Preferably, the soluble fraction (SF) has an intrinsic viscosity of 2.0 to 4.0 dl/g.

The heterophasic polypropylene composition preferably has a melt flow rate $MFR_2$ of 0.2 to 100 g/10 min, more preferably of 1 to 40 g/10 min.

The propylene homopolymer, the propylene random copolymer or the heterophasic propylene copolymer according to the present invention may comprise the usual additives, which are selected based on the requirements of the final application, and are well-known in the art.

The propylene homopolymer, the propylene random copolymer or the heterophasic propylene copolymers made by the catalysts of the invention are useful in all kinds of end articles such as pipes, films (cast, blown or BOPP films), fibers, moulded articles (e.g. injection moulded, blow moulded, rotomoulded articles), extrusion coatings and so on.

The invention will now be illustrated by reference to the following non-limiting Examples and figures.

BRIEF DESCRIPTION OF FIGURES

FIG. 1a is a schematic representation of the CRYSTEX QC instrument is shown in FIG. 1a.

Figure 1A:
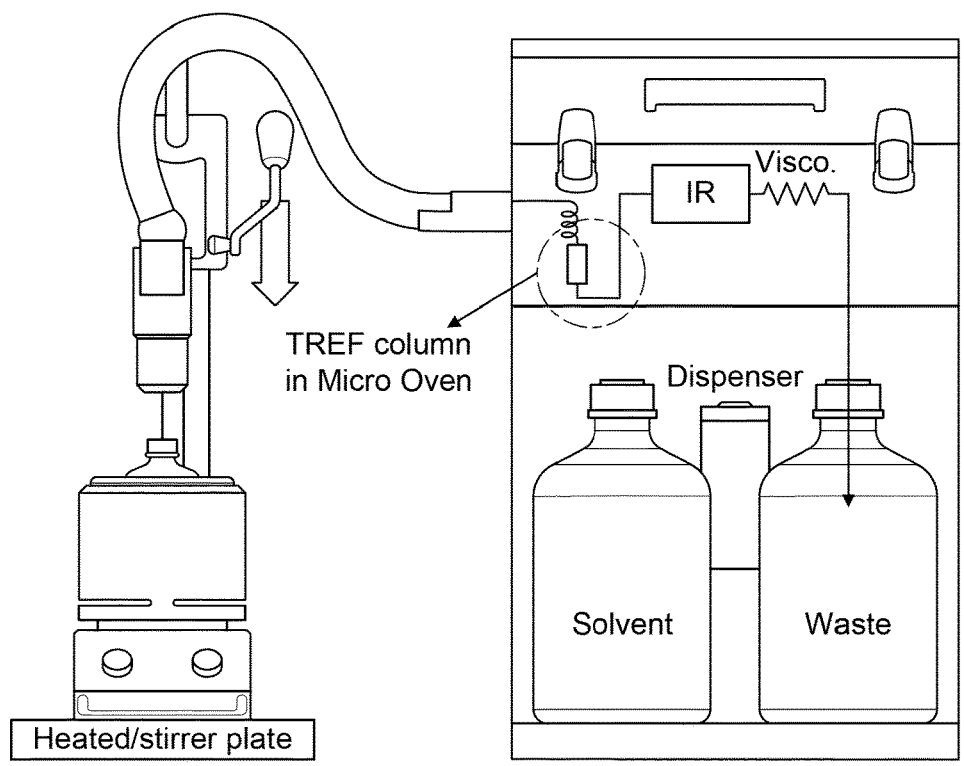

MEASUREMENT METHODS (a) Melt Flow Rate (MFR)

The melt flow rate is measured as the $MFR_2$ in accordance with ISO 1133 15 (230° C., 2.16 kg load) for polypropylene. The MFR is an indication of the flowability, and hence the processability, of the polymer, but is also a measure of the polymer Mw. The higher the melt flow rate, the lower the viscosity of the polymer, hence its molecular weight.

(b) Number Average Molecular Weight (Mn), Weight Average Molecular Weight (Mw) and Polydispersity (Mw/Mn)

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-1:

2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i / M_i)} \quad (1)$$

$$M_w = \frac{\sum_{i=1}^{N} (A_i \times M_i)}{\sum_{i=1}^{N} A_i} \quad (2)$$

$$M_z = \frac{\sum_{i=1}^{N} (A_i \times M_i^2)}{\sum_{i=1}^{N} (A_i \times M_i)} \quad (3)$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain), equipped with 3× Agilent-PLgel Olexis and 1× Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 μL of sample solution was injected per analysis. Data collection was performed using either Agilent Cirrus software version 3.3 or PolymerChar GPC-IR control software.

The column set was calibrated using universal calibration (according to ISO 16014-2:2003) with 19 narrow MWD polystyrene (PS) standards in the range of 0.5 kg/mol to 11 500 kg/mol. The PS standards were dissolved at room temperature over several hours. The conversion of the polystyrene peak molecular weight to polyolefin molecular weights is accomplished by using the Mark Houwink equation and the following Mark Houwink constants:

$$K_{PS} = 19 \times 10^{-3} \text{ mL/g}, \alpha_{PS} = 0.655$$

$$K_{PE} = 39 \times 10^{-3} \text{ mL/g}, \alpha_{PE} = 0.725$$

$$K_{PP} = 19 \times 10^{-3} \text{ mL/g}, \alpha_{PP} = 0.725$$

A third order polynomial fit was used to fit the calibration data.

All samples were prepared in the concentration range of 0.5-1 mg/ml and dissolved at 160° C. for 2.5 hours for PP or 3 hours for PE under continuous gentle shaking.

(c) DSC Analysis, Peak Melting Temperature ($T_m$), Heat of Melting ($H_m$), and Peak Crystallization Temperature ($T_c$)

DSC analysis was measured with a Mettler TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature (Tc) is determined from the cooling step, while peak melting temperature (Tm) and heat of melting ($H_m$) are determined from the second heating step.

(d) Intrinsic Viscosity

Intrinsic viscosity (iV) has been measured according to DIN ISO 1628/1, October 1999 (in Decaline at 135° C.).

(e) Xylene Cold Soluble Fraction

The xylene cold solubles (XCS, wt %) were determined at 25° C. according to ISO 16152; 2005.

(f) Al and Zr Determination (ICP-Method)

The elementary analysis of a catalyst was performed by taking a solid sample of mass, M, cooling over dry ice. Samples were diluted up to a known volume, V, by dissolving in nitric acid (HNO3, 65%, 5% of V) and freshly deionised (DI) water (5% of V). The solution was then added to hydrofluoric acid (HF, 40%, 3% of V), diluted with DI water up to the final volume, V, and left to stabilise for two hours.

The analysis was run at room temperature using a Thermo Elemental iCAP 6300 Inductively Coupled Plasma—Optical Emmision Spectrometer (ICP-OES) which was calibrated using a blank (a solution of 5% HNO3, 3% HF in DI water), and 6 standards of 0.5 ppm, 1 ppm, 10 ppm, 50 ppm, 100 ppm and 300 ppm of Al, with 0.5 ppm, 1 ppm, 5 ppm, 20 ppm, 50 ppm and 100 ppm of Hf and Zr in solutions of 5% HNO3, 3% HF in DI water.

Immediately before analysis the calibration is 'resloped' using the blank and 100 ppm Al, 50 ppm Hf, Zr standard, a quality control sample (20 ppm Al, 5 ppm Hf, Zr in a solution of 5% HNO3, 3% HF in DI water) is run to confirm the reslope. The QC sample is also run after every 5th sample and at the end of a scheduled analysis set.

The content of hafnium was monitored using the 282.022 nm and 339.980 nm lines and the content for zirconium using 339.198 nm line. The content of aluminium was monitored via the 167.079 nm line, when Al concentration in ICP sample was between 0-10 ppm (calibrated only to 100 ppm) and via the 396.152 nm line for Al concentrations above 10 ppm.

The reported values are an average of three successive aliquots taken from the same sample and are related back to the original catalyst by inputting the original mass of sample and the dilution volume into the software.

(g) Crystex Analysis

Crystalline and Soluble Fractions Method

The crystalline (CF) and soluble fractions (SF) of the polypropylene (PP) compositions as well as the comonomer content and intrinsic viscosities of the respective fractions were analyzed by the CRYSTEX QC, Polymer Char (Valencia; Spain).

Figure 1B:
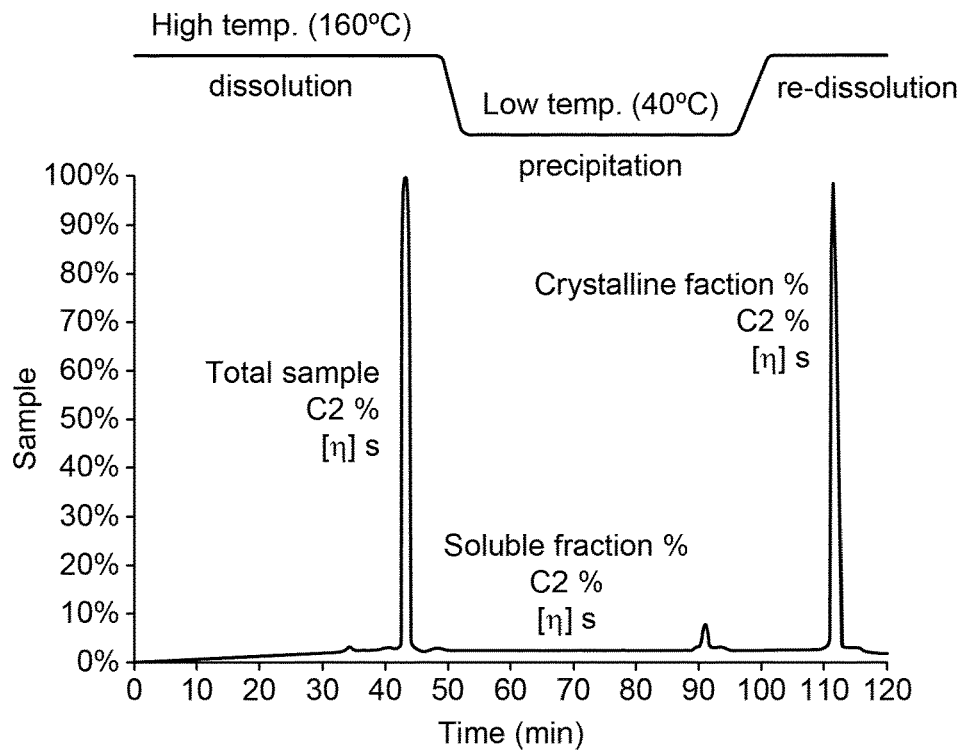
FIG. 1b shows an elution diagram of an exemplary ethylene-propylene copolymer sample and obtained soluble and crystalline fractions in the TREF column (column filled with inert material e.g. glass beads).

A schematic representation of the CRYSTEX QC instrument is shown in FIG. 1a. The crystalline and amorphous fractions are separated through temperature cycles of dissolution at 160° C., crystallization at 40° C. and re-dissolution in 1,2,4-trichlorobenzene (1,2,4-TCB) at 160° C. as shown in FIG. 1b. Quantification of SF and CF and determination of ethylene content (C2) are achieved by means of an infrared detector (IR4) and an online 2-capillary viscometer which is used for the determination of the intrinsic viscosity (IV).

The IR4 detector is a multiple wavelength detector detecting IR absorbance at two different bands (CH3 and CH2) for the determination of the concentration and the Ethylene content in Ethylene-Propylene copolymers. IR4 detector is calibrated with series of 8 EP copolymers with known Ethylene content in the range of 2 wt % to 69 wt % (determined by 13C-NMR) and various concentration between 2 and 13 mg/ml for each used EP copolymer used for calibration.

The amount of Soluble fraction (SF) and Crystalline Fraction (CF) are correlated through the XCS calibration to the "Xylene Cold Soluble" (XCS) quantity and respectively Xylene Cold Insoluble (XCI) fractions, determined according to standard gravimetric method as per ISO16152. XCS calibration is achieved by testing various EP copolymers with XCS content in the range 2-31 wt %.

The intrinsic viscosity (IV) of the parent EP copolymer and its soluble and crystalline fractions are determined with a use of an online 2-capillary viscometer and are correlated to corresponding IV's determined by standard method in decalin according to ISO 1628. Calibration is achieved with various EP PP copolymers with IV=2-4 dL/g.

A sample of the PP composition to be analyzed is weighed out in concentrations of 10 mg/ml to 20 mg/ml. After automated filling of the vial with 1,2,4-TCB containing 250 mg/I 2,6-tert-butyl-4-methylphenol (BHT) as antioxidant, the sample is dissolved at 160° C. until complete dissolution is achieved, usually for 60 min, with constant stirring of 800 rpm.

As shown in a FIGS. 1a and b, a defined volume of the sample solution is injected into the column filled with inert support where the crystallization of the sample and separation of the soluble fraction from the crystalline part is taking place. This process is repeated two times.

During the first injection the whole sample is measured at high temperature, determining the IV [dl/g] and the C2 [wt %] of the PP composition. During the second injection the soluble fraction (at low temperature) and the crystalline fraction (at high temperature) with the crystallization cycle are measured (Wt % SF, Wt % C2, IV).

EP means ethylene propylene copolymer.
PP means polypropylene.

FIG. 1a shows a schematic diagram of the CRYSTEX QC instrument.

FIG. 1b shows an elution diagram of an exemplary ethylene-propylene copolymer sample and obtained soluble and crystalline fractions in the TREF column (column filled with inert material e.g. glass beads) (see Del Hierro, P.; Ortin, A.; Monrabal, B.; 'Soluble Fraction Analysis in polypropylene, The Column Advanstar Publications, February 2014. Pages 18-23).

(h) Quantification of Microstructure by NMR Spectroscopy

Quantitative nuclear-magnetic resonance (NMR) spectroscopy was further used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2.1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E = 0.5(S\beta\beta + S\beta\gamma + S\beta\delta + 0.5(S\alpha\beta + S\alpha\gamma))$$

Through the use of this set of sites the corresponding integral equation becomes:

$$E = 0.5(I_H + I_G + 0.5(I_C + I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E\,[\text{mol}\,\%] = 100 * fE$$

The weight percent comonomer incorporation was calculated from the mole fraction:

$$E\,[\text{wt}\,\%] = 100 * (fE * 28.06) / ((fE * 28.06) + ((1 - fE) * 42.08))$$

i) Comonomer Content by IR Spectroscopy

Quantitative infrared (IR) spectroscopy was used to quantify the ethylene content of the copolymers through calibration to a primary method.

Calibration was facilitated through the use of a set of in-house non-commercial calibration standards of known ethylene contents determined by quantitative $^{13}C$ solution-state nuclear magnetic resonance (NMR) spectroscopy. The calibration procedure was undertaken in the conventional manner well documented in the literature. The calibration set consisted of 38 calibration standards with ethylene contents ranging 0.2-75.0 wt % produced at either pilot or full scale under a variety of conditions. The calibration set was selected to reflect the typical variety of copolymers encountered by the final quantitative IR spectroscopy method. Quantitative IR spectra were recorded in the solid-state using a Bruker Vertex 70 FTIR spectrometer. Spectra were recorded on 25×25 mm square films of 300 μm thickness prepared by compression moulding at 180-210° C. and 4-6 mPa. For samples with very high ethylene contents (>50 mol %) 100 um thick films were used. Standard transmission FTIR spectroscopy was employed using a spectral range of 5000-500 $cm^{-1}$, an aperture of 6 mm, a spectral resolution of 2 $cm^{-1}$, 16 background scans, 16 spectrum scans, an interferogram zero filling factor of 64 and Blackmann-Harris 3-term apodisation.

Quantitative analysis was undertaken using the total area of the $CH_2$ rocking deformations at 730 and 720 $cm^{-1}$ ($A_Q$) corresponding to $(CH_2)_{>2}$ structural units (integration method G, limits 762 and 694 $cm^{-1}$). The quantitative band was normalised to the area of the CH band at 4323 $cm^{-1}$ ($A_R$) corresponding to CH structural units (integration method G, limits 4650, 4007 $cm^{-1}$). The ethylene content in units of weight percent was then predicted from the normalised absorption ($A_Q/A_R$) using a quadratic calibration curve. The calibration curve having previously been constructed by ordinary least squares (OLS) regression of the normalised absorptions and primary comonomer contents measured on the calibration set.

THE PRESENT INVENTION WILL NOW BE ILLUSTRATED BY WAY OF EXAMPLES

The following complex C1 as shown below was used in preparing catalysts for the Comparative Examples (CE1-CE4) and the Inventive Examples (IE1-IE4)

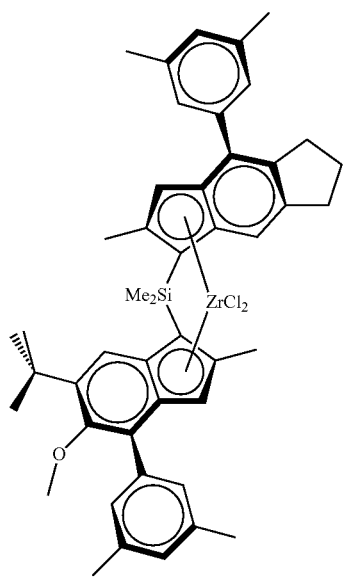

C1 (rac-anti-dimethylsilanediyl(2-methyl-4-(3',5'-dimethylphenyl)-1,5,6,7-tetrahydro-s-indacen-1-yl)(2-methyl-4-(3',5'-dimethylphenyl)-5-methoxy-6-tert-butyl inden-1-yl) zirconium dichloride) was synthesized according to the procedure as described in WO2019/007655, pp 49ff.

Preparation of MAO-Silica Support

A glass reactor equipped with a mechanical stirrer was charged with silica grade DM-L-303 from AGC Si-Tech Co, pre-calcined at 600° C. (10.0 g). Then dry toluene (50 mL) was added. The mixture was then heated to 35° C. and stirred at 35° C. (40 rpm) for 15 min. Next 30 wt % solution of MAO in toluene (25 mL) from Lanxess was added via cannula over the course of 25 minutes and then stirred for 2 more hours at 35° C. The solid was allowed to settle and the mother liquor was siphoned off and discarded. Toluene (50 mL) was added and the mixture was heated to 80° C. and stirred at this temperature for 1 hour. The solids were allowed to settle, and the liquid was siphoned off and discarded. The toluene wash was repeated two more times, followed by a heptane (50 mL) wash at 60° C. Then the cake was dried under vacuum at 60° C. over for hours to yield 13.7 g of support as white powder.

ICS 1 (Inventive Catalyst System 1): Catalyst Preparation

In a nitrogen filled glovebox, a solution of MAO 0.5 mL (30% wt in toluene, AXION 1330 CA Lanxess) in dry toluene (2 mL) was added to an aliquot of metallocene C1 (63.0 mg, 78 μmol). After 60 minutes stirring at room temperature, 72.0 mg of trityl tetrakis(pentafluorophenyl) borate was added. The mixture was stirred for 60 minutes at room temperature. Next, 2.0 g of MAO treated silica prepared as described above, was placed in a glass vial. The solution of metallocene, MAO and borate in toluene was then slowly added to the support over the course of 10 minutes with gentle mixing. The resulting mixture was shaken well and allowed to stay overnight. Then dry toluene (10 mL) was added, and the slurry was mixed well at 60° C. for 30 minutes. The solid was allowed to settle, and liquid was siphoned off and discarded. The wash was repeated twice with 10 mL toluene and once with 10 mL heptane at room temperature. The resulting cake was dried in Ar flow for 3 hours at 60° C. to yield 2.3 g of the catalyst as pink free flowing powder.

ICS 2 (Inventive Catalyst System 2): Catalyst Preparation

In a nitrogen filled glovebox, a solution of MAO 0.5 mL (30% wt in toluene, AXION 1330 CA Lanxess) in dry toluene (2 mL) was added to an aliquot of metallocene C1 (63.0 mg, 78 μmol). After 60 minutes stirring at room temperature, 36.0 mg of trityl tetrakis(pentafluorophenyl) borate was added. The mixture was stirred for 60 minutes at room temperature. Next, 2.0 g of MAO treated silica prepared as described above (Support B), was placed in a glass vial. The solution of metallocene, MAO and borate in toluene was then slowly added to the support over the course of 10 minutes with gentle mixing. The resulting mixture was shaken well and allowed to stay overnight. Then dry toluene (10 mL) was added, and the slurry was mixed well at 60° C. for 30 minutes. The solid was allowed to settle, and liquid was siphoned off and discarded. The wash was repeated twice with 10 mL toluene and once with 10 mL heptane at room temperature. The resulting cake was dried in Ar flow for 3 hours at 60° C. to yield 2.2 g of the catalyst as pink free flowing powder.

CCS 1 (Comparative Catalyst System 1): Catalyst Preparation

In a nitrogen filled glovebox, a solution of MAO 0.25 mL (30% wt in toluene, AXION 1330 CA Lanxess) in dry toluene (1 mL) was added to an aliquot of metallocene C1

(31.5 mg, 38 µmol). The mixture was stirred for 60 minutes at room temperature. Next, 1.0 g of MAO treated silica prepared as described above (support B), was placed in a glass vial. The solution of metallocene and MAO in toluene was then slowly added to the support over the course of 5 minutes with gentle mixing. The resulting mixture was shaken well and allowed to stay overnight. Then dry toluene (5 mL) was added, and the slurry was mixed well at 60° C. for 30 minutes. The solid was allowed to settle, and liquid was siphoned off and discarded. The wash was repeated twice with 5 mL toluene and once with 5 mL heptane at room temperature. The resulting cake was dried in Ar flow for 3 hours at 60° C. to yield 1.0 g of the catalyst as pink free flowing powder.

CCS 2 (Comparative Catalyst System 2): Catalyst Preparation

Inside the glovebox, 86.8 mg of dry and degassed surfactant S2 were mixed with 2 mL of MAO in a septum bottle and left to react overnight. The following day, 41.1 mg of C1 (0,051 mmol, 1 equivalent) were dissolved with 4 mL of the MAO solution in another septum bottle and left to stir inside the glovebox.

After 60 minutes, 1 mL of the surfactant solution and the 4 mL of the MAO-metallocene solution were successively added into a 50 mL emulsification glass reactor containing 40 mL of PFC (perfluoro-1.3-dimethylcyclohexane) at −10° C. and equipped with an overhead stirrer (stirring speed=600 rpm). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 35 minutes the solvent was siphoned off. The remaining red catalyst was dried during 2 hours at 50° C. over an argon flow. 0.54 g of a red free flowing powder was obtained. (Al 36.9 wt %, Zr 0.26 wt % Al/Zr (molar) 480)

S2: 1H,1H-Perfluoro(2-methyl-3-oxahexan-1-ol) (CAS 26537-88-2) purchased from Unimatec, dried over activated molecular sieves (2 times) and degassed by argon bubbling prior to use.

The pre-polymerization step for the catalyst (off-line prepolymerization) was done in a 125 mL pressure reactor equipped with gas-feeding lines and an overhead stirrer. Dry and degassed perfluoro-1.3-dimethylcyclohexane (15 cm3) and the desired amount of the catalyst to be pre-polymerized were loaded into the reactor inside a glove box and the reactor was sealed. The reactor was then taken out from the glove box and placed inside a water cooled bath kept at 25° C. The overhead stirrer and the feeding lines were connected and stirring speed set to 450 rpm. The experiment was started by opening the propylene feed into the reactor. The total pressure in the reactor was raised to about 5 barg and held constant by propylene feed via mass flow controller until the target degree of polymerization was reached. The reaction was stopped by flashing the volatile components. Inside glove box, the reactor was opened and the content poured into a glass vessel. The perfluoro-1,3-dimethylcyclohexane was evaporated until a constant weight was obtained to yield the pre-polymerized catalyst.

CC3 (Comparative Catalyst System 3): Catalyst Preparation

The same catalyst complex as for CC2 was used, but in addition to MAO also a borate cocatalyst was added.

Inside the glovebox, 234.3 mg of dry and degassed surfactant S2 (in 0.2 mL toluene) were added dropwise to 5 mL of MAO. The solution was left under stirring for 30 minutes. Then, 95.6 mg of C1 were added to the MAO/surfactant solution. After 60 minutes stirring, 104.9 mg of trityl tetrakis(pentafluorophenyl)borate were added.

After. 60 minutes stirring, 5 mL of the surfactant-MAO-metallocene-borate solution was successively added into a 50 mL emulsification glass reactor containing 40 mL of PFC at −10° C. and equipped with an overhead stirrer (stirring speed=600 rpm). A red emulsion formed immediately and was stirred during 15 minutes at −10° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 35 minutes the solvent was siphoned off. The catalyst was left to settle up on top of the PFC and after 35 minutes the solvent was siphoned off. The remaining catalyst was dried during 2 hours at 50° C. under argon flow. 0.70 g of a red free flowing powder was obtained. (Al 31.9 wt %, Zr 0.56 wt % Al/Zr (molar) 193; B/Zr (molar) 0.98)

The catalyst was prepolymerized as described above for CC2.

TABLE 1

| Catalyst system | Degree of prepolymerization g(PP)/g(cat) | Al wt% | Zr wt% | Al/Zr molar | B/Zr molar | MC content based on Zr wt% |
|---|---|---|---|---|---|---|
| CCS2 | 3.2 | 36.9 | 0.26 | 480 | 0 | 2.83 |
| CCS3 | 5.5 | 31.9 | 0.56 | 193 | 1 | 6.77 |
| ICS1 | n.a. | 12.30 | 0.13 | 320 | 1 | 1.16 |
| ICS2 | n.a. | 12.00 | 0.15 | 280 | 0.5 | 1.30 |

*analytical data refer to the pure (non-prepolymerized) catalysts
n.a. not applicable Polymerizations:
2-Step Bulk (C3 Homo)+Gas Phase (C2/C3) Polymerization
Step 1: Prepolymerization and Bulk Homopolymerization The autoclave containing 0.4 barg propylene was filled with ~4400 g propylene. Triethylaluminum (0.80 ml of a 0.62 mol/l solution in heptane) was injected into the reactor by additional x g propylene. The solution was stirred at 20° C. and 250 rpm for at least 20 min. The catalyst system as prepared above was injected as described in the following. The desired amount of solid catalyst was loaded into a 5 ml stainless steel vial inside a glovebox, then a second 5 ml vial containing 4 ml n-heptane and pressurized with 7 bars of nitrogen was added on top of it. This dual feeder system was mounted on a port on the lid of the autoclave. Directly follows the dosing of the desired H2 amount via mass flow controller. Afterwards the valve between the two vials was opened and the solid catalyst was contacted with heptane under nitrogen pressure for 2 s, and then flushed into the reactor with x g propylene. The prepolymerization was run for 10 min. At the end of the prepolymerization step, the temperature was raised to 75° C. and was held constant throughout the polymerization. The polymerization time was measured starting, when the internal reactor temperature reached 2° C. below the set polymerization temperature.

Step 2: Gas Phase C3C2 Copolymerization

After the bulk step was completed, the stirrer speed was reduced to 50 rpm and the pressure was reduced to 0.3 bar-g by venting the monomers. The stirrer speed was set to 180 rpm and the reactor temperature was set to 70° C. Then the reactor pressure was increased to the set value by feeding a defined C3/C2 gas mixture (see tables). Pressure and temperature were held constant by feeding via mass flow controller, a C3/C2 gas mixture, of composition, corresponding to the target polymer composition and by thermostat, until the set time for this step had expired.

Then the reactor was cooled down (to about 30° C.) and the volatile components flashed out. After purging the reactor 3 times with N2 and one vacuum/N2 cycle, the product was taken out and dried overnight in a fume hood. 100 g of the polymer was additivated with 0.5 wt % Irganox B225 (solution in acetone) and dried overnight in a hood followed by 2 hours in a vacuum drying oven at 60° C.

TABLE 3 b)

| | | Soluble Fraction | | | |
|---|---|---|---|---|---|
| Example | Catalyst system | iV (SF) (Crystex) dl/g | C2(XCS) from IR(XCS) % | Mw g/mol | Mw/Mn |
| IE1 | ICS1 | 2.7 | 25.3 | 250500 | 3.0 |
| IE2 | ICS1 | 2.3 | 24.3 | 249000 | 2.6 |

TABLE 2

Polymerization procedures

| | | | | Liquid Slurry | | | Transition to gas phase EP | | |
|---|---|---|---|---|---|---|---|---|---|
| Example | Catalyst System | Catalyst amount mg | H2 fed before catalyst feed NL | H2 fed after T ramp NL | T °C. | time min | Pressure flashed down to barg | Time transition to GP2 min | C2 fed in transition (MFC) g |
| IE1 | ICS1 | 31.0 | 0.31 | Prepoly 1.7 | 75 | 40 | 0.3 | 15 | 238 |
| IE2 | ICS1 | 37.0 | 2.00 | at 0.0 | 75 | 40 | 0.3 | 15 | 182 |
| IE3 | ICS2 | 35.0 | 2.01 | 20° C. 0.0 | 75 | 40 | 0.3 | 14 | 327 |
| IE4 | ICS2 | 63.0 | 2.01 | for 0.0 | 75 | 40 | 0.3 | 15 | 181 |
| CE1 | CCS | 90.0 | 2.01 | 10 0.0 | 75 | 40 | 0.3 | 16 | 234 |
| CE2 | CCS | 38.6 | 0.00 | min 2.0 | 80 | 40 | 0.3 | 19 | 213 |
| CE3 | CCS | 15.3 | 2.01 | 0.0 | 75 | 40 | 0.3 | 17 | 236 |
| CE4 | CCS | 13.6 | 2.01 | 0.0 | 75 | 40 | 0.3 | 15 | 184 |

| | Transition to gas phase EP | | | Gas phase | | | | | |
|---|---|---|---|---|---|---|---|---|---|
| Example | C3 fed in transition (MFC) g | Feed C2/C3 during transition wt/wt | Ptotal av. barg | Added H2 in GP NL | Temperature °C. | time min | C2 fed in GP2 (MFC) g | C3 fed in GP2 (MFC) g | Feed C2/C3 wt/wt |
| IE1 | 344 | 0.692 | 20 | 0 | 70 | 90 | 196 | 599 | 0.3 |
| IE2 | 262 | 0.695 | 16 | 0 | 70 | 90 | 113 | 347 | 0.3 |
| IE3 | 333 | 0.712 | 20 | 0 | 70 | 90 | 188 | 570 | 0.3 |
| IE4 | 261 | 0.693 | 16 | 0 | 70 | 90 | 82 | 250 | 0.3 |
| CE1 | 339 | 0.690 | 20 | 0 | 70 | 90 | 80 | 250 | 0.3 |
| CE2 | 378 | 0.563 | 20 | 0 | 70 | 90 | 47 | 187 | 0.3 |
| CE3 | 337 | 0.700 | 20 | 0 | 70 | 90 | 256 | 775 | 0.3 |
| CE4 | 267 | 0.689 | 16 | | | | 104 | 316 | 0.3 |

MFC mass flow controller

Table 3a)+3b) Show the Results of the Polymerization

TABLE 3a)

Whole polymer

| Ex. | Catalyst system | Total yield g | Overall productivity kg/g cat | Overall metallocene productivity kg/g MC | MFR2 powder g/10 min | XCS wt% | SF Crystex wt% | Tm °C. |
|---|---|---|---|---|---|---|---|---|
| 1E1 | ICS1 | 1406 | 23 | 1987 | 0.6 | 53 | 51 | 155 |
| 1E2 | ICS1 | 1582 | 24 | 2036 | 1.1 | 29 | 30 | 157 |
| 1E3 | ICS2 | 1052 | 30 | 2311 | 0.6 | 39 | 41 | 157 |
| 1E4 | ICS2 | 1430 | 23 | 1746 | 1.4 | 24 | 23 | 157 |
| CE1 | CCS1 | 1273 | 14 | n.d. | 0.6 | 25 | 25 | 153 |
| CE2 | CCS2 | 866 | 22 | 732 | 13.6 | n.d. | 29 | 151 |
| CE3 | CCS3 | 2020 | 132 | 1852 | 1.1 | 51 | 53 | 157 |
| CE4 | CCS3 | 1335 | 98 | 1377 | 1.8 | 34 | 33 | 157 |

TABLE 3 b)-continued

| | | Soluble Fraction | | | |
|---|---|---|---|---|---|
| Example | Catalyst system | iV (SF) (Crystex) dl/g | C2(XCS) from IR(XCS) % | Mw g/mol | Mw/Mn |
| IE3 | ICS2 | 2.9 | 25.4 | n.d. | n.d. |
| IE4 | ICS2 | 2.5 | 24.5 | n.d. | n.d. |
| CE1 | CCS1 | 3.6 | 22.5 | 401500 | 2.6 |
| CE2 | CCS2 | 2.3 | 22.1 | 263000 | 2.9 |
| CE3 | CCS3 | 2.3 | 25.6 | 251500 | 3.2 |
| CE4 | CCS3 | 2.1 | 24.7 | 228000 | 2.8 |

Figure 2:
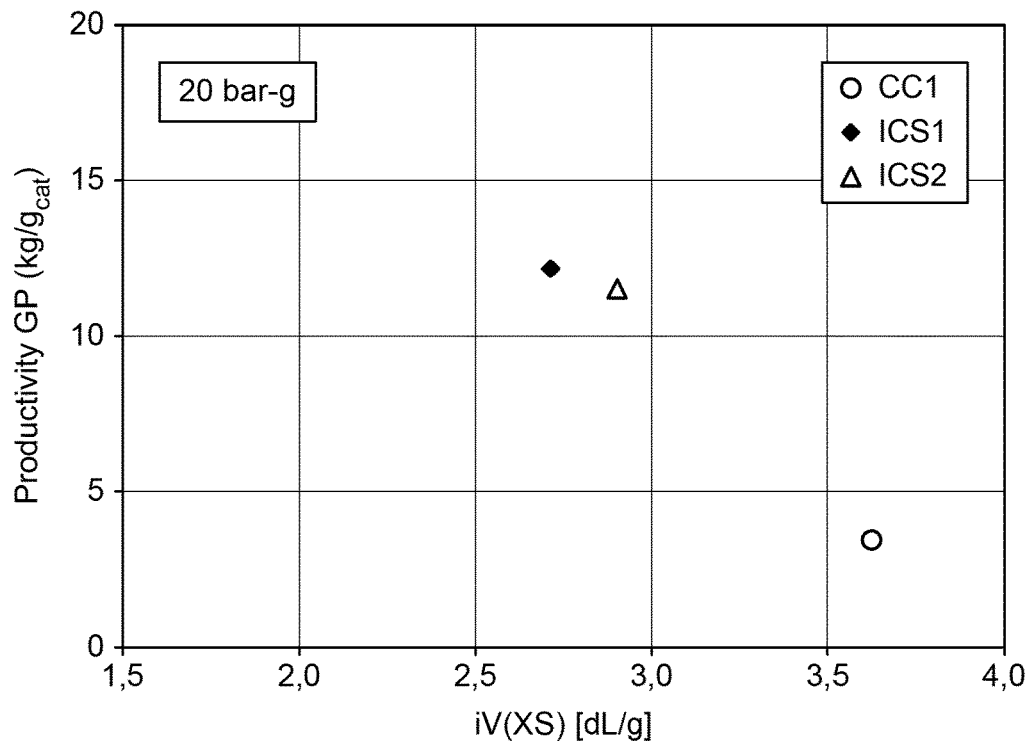
FIG. 2 plots the XCS of the iV fraction vs productivity in the gas phase for examples herein.
Figure 3:
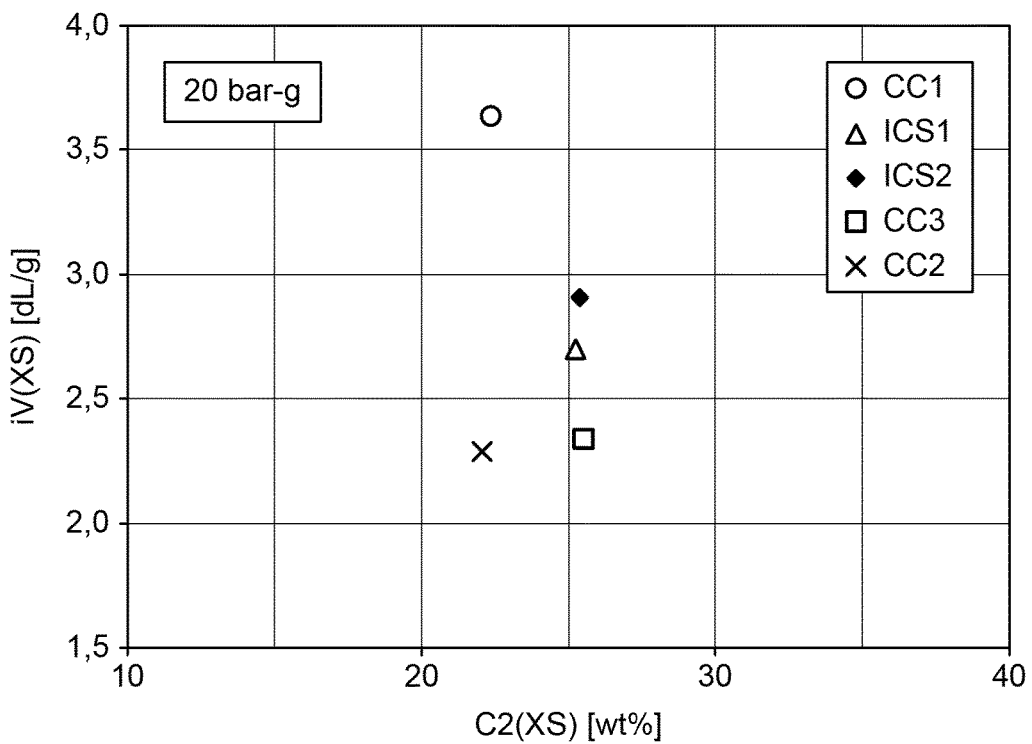
FIG. 3 plots the ethylene content of the XCS fraction vs the iV of the XCS fraction for examples of the invention.
Figure 4:
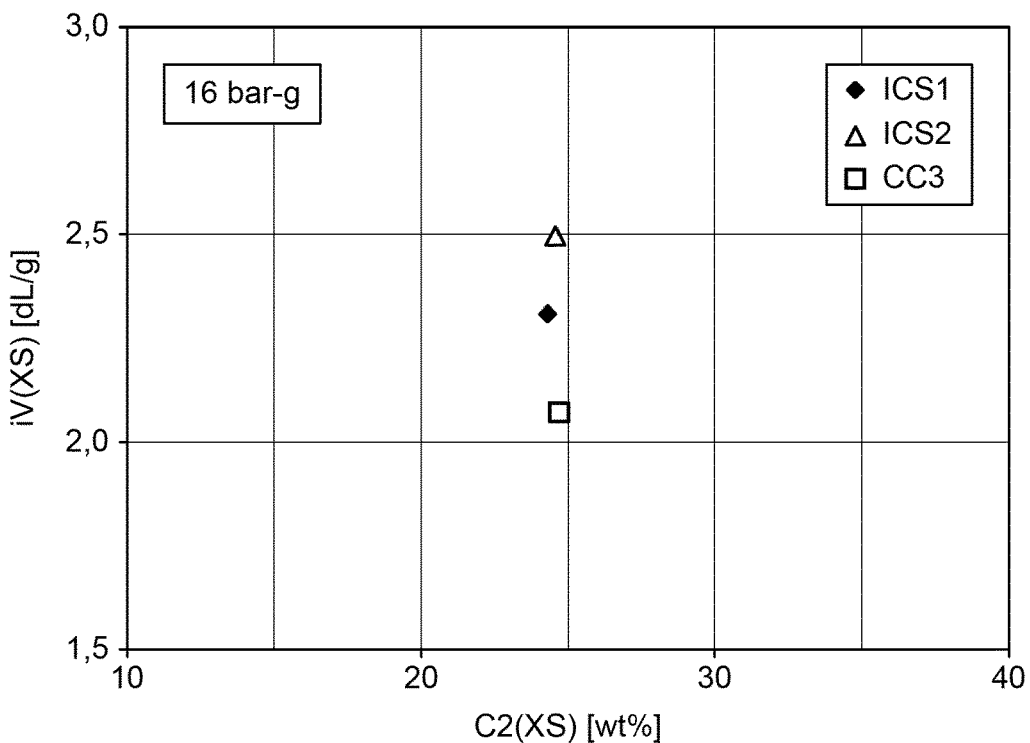
FIG. 4 plots the ethylene content of the XCS fraction vs the iV of the XCS fraction for examples of the invention.

From FIGS. 2 to 4 it can be clearly seen that by adding a borate to a silica/MAO/metallocene catalyst, catalyst systems with higher gas phase activity are obtained (FIG. 2), which furthermore yield heterophasic propylene copolymers having a higher molecular weight than heterophasic propylene copolymers produced with self-supported catalysts (produced according to Borealis Sirius catalyst technology) (FIGS. 3 and 4).

The following complex 02 as shown below was used in preparing catalysts for the Comparative Examples (CE5-CE9) and the Inventive Examples (IE5-IE9)

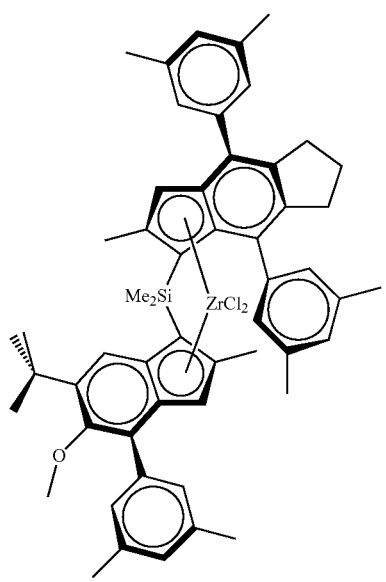

4,8-Di(3,5-dimethylphenyl)-6-methyl-1,2,3,5-tetrahydro-s-indacene

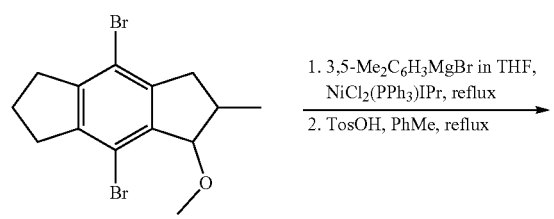

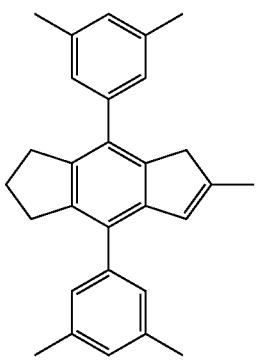

To a mixture of 2.0 g (2.56 mmol) of NiCl$_2$(PPh$_3$)IPr and 36.3 g (100.8 mmol) of 4,8-dibromo-1-methoxy-2-methyl-1,2,3,5,6,7-hexahydro-s-indacene 500 ml (250 mmol, 2.5 equiv) of 0.5 M 3,5-dimethylphenylmagnesium bromide in THF was added at a such rate to maintain a gentle reflux (for ca. 15 min). The resulting solution was refluxed additionally for 1 h, then cooled to room temperature, and 1200 ml of 0.5 M HCl and 500 ml of dichloromethane were added. The organic layer was separated, dried over K$_2$CO$_3$, passed through a short pad of silica gel 60 (40-63 µm, ca. 30 ml) and then evaporated to dryness to give the crude mixture of the diastereoisomers of 4,8-di(3,5-dimethylphenyl)-1-methoxy-2-methyl-1,2,3,5,6,7-hexahydro-s-indacene as a brownish oil. Further on, 315 mg of TsOH was added to a solution of the crude product in 420 ml of toluene, and the resulting mixture was refluxed using Dean-Stark head for 10 min. Then, one more portion of 220 mg of TsOH was added, and the obtained mixture was refluxed for 10 min. Finally, the last operation was repeated with 50 mg of TsOH. After cooling to room temperature the reaction mixture was washed with 200 ml of 10% K$_2$CO$_3$. The organic layer was separated, and the aqueous layer was additionally extracted with 200 ml of dichloromethane. The combined organic extract was dried over anhydrous K$_2$CO$_3$ (the organic layer became crimson at this stage), passed through a short pad of silica gel 60 (40-63 Pm, 30 ml), and the resulting light-yellow solution was evaporated to ca. 30 ml to give a solution with a significant amount of a white precipitate. To this mixture 300 ml of n-hexane was added. The precipitated solid was filtered off (G3), washed with n-hexane, and dried in vacuum. This procedure gave 29.33 g (77.48 mmol, 76.9%) of 4,8-di(3,5-dimethylphenyl)-6-methyl-1,2,3,5-tetrahydro-s-indacene as a white fine-crystalline solid. The mother liquor was evaporated to dryness to give a yellowish solid mass. This mass was triturated with 40 ml of warm n-hexane, cooled to room temperature, and filtered off (G3). The obtained solid was washed with n-hexane and dried in vacuum. This procedure gave additionally 4.55 g (12.02 mmol, 11.9%) of 4,8-di(3,5-dimethylphenyl)-6-methyl-1,2,3,5-tetrahydro-s-indacene as a white powder. Thus, the total yield the title product was 33.88 g (89.5 mmol, 88.8%).

$^1$H NMR (CDCl$_3$): δ 7.04 (s, 2H), 7.03 (s, 2H), 6.98 (s, 2H), 6.43 (m, 1H), 3.23 (s, 2H), 2.89 (t, J=7.3 Hz, 2H), 2.83 (t, J=7.3 Hz, 2H), 2.38 (s, 6H), 2.37 (s, 6H), 2.04 (s, 3H), 1.99 (quint, J=7.3 Hz, 2H). $^{13}$C{$^1$H} NMR (CDCl$_3$): δ 145.38, 142.84, 140.85, 140.43, 140.21, 139.80, 138.37, 137.55, 137.39, 133.44, 129.64, 128.39, 128.19, 127.31, 126.61, 126.34, 42.49, 32.76, 32.51, 26.08, 21.43, 16.81

43

[4,8-Bis(3,5-dimethylphenyl)-2-methyl-1,5,6,7-tetra-hydro-s-indacen-1-yl]chlorodimethylsilane

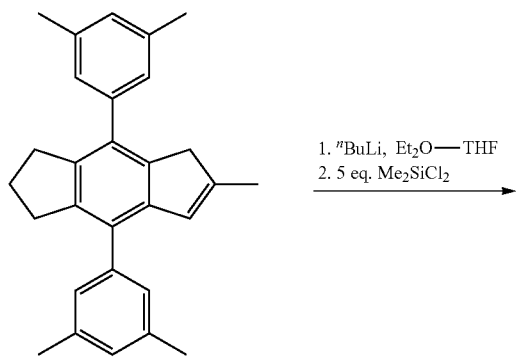

To a suspension of 11.96 g (31.59 mmol) of 4,8-di(3,5-dimethylphenyl)-6-methyl-1,2,3,5-tetrahydro-s-indacene in a mixture of 250 ml of ether and 40 ml of THF, cooled to −30° C., 13.0 ml (31.59 mmol) of 2.43 M $^n$BuLi in hexanes was added in one portion. The resulting mixture was stirred overnight at room temperature, then thus obtained light-orange solution with a large amount of orange precipitate was cooled to −50° C., and 19.0 ml (20.33 g, 157.5 mmol, 4.99 eqv.) of dichlorodimethylsilane was added in one portion. This mixture was stirred overnight at room temperature and then filtered through a glass frit (G3), the flask and filter cake were rinsed with 50 ml of toluene. The filtrate was evaporated to dryness to give 14.9 g (~100%) of the title compound as a white solid mass which was further used without an additional purification.

$^1$H NMR (CDCl$_3$): δ 7.09 (s, 2H), 7.02-6.94 (m, 4H), 6.51 (m, 1H), 4.07 (s, 1H), 3.26-3.14 (m, 1H), 2.95-2.79 (m, 2H), 2.60 (ddd, J=12.4 Hz, J=8.4 Hz, J=4.1 Hz, 1H), 2.38 and 2.37 (2s, sum 12H), 2.24 (s, 3H), 2.12-1.99 (m, 1H), 1.95-1.80 (m, 1H), −0.16 (s, 3H), −0.20 (s, 3H). $^{13}$C{$^1$H} NMR (CDCl$_3$): δ 146.19, 143.17, 140.68, 140.29, 139.94, 139.92, 138.37, 137.59, 137.42, 132.60, 129.86, 128.52, 128.24, 127.85, 127.28, 126.32, 49.67, 33.33, 32.73, 26.15, 21.45, 21.42, 18.10, 3.92, −1.45.

44

[4,8-Bis(3,5-dimethylphenyl)-2-methyl-1,5,6,7-tetra-hydro-s-indacen-1-yl][6-tert-butyl-4-(3,5-dimethylphenyl)-5-methoxy-2-methyl-1H-inden-1-yl]dimethylsilane

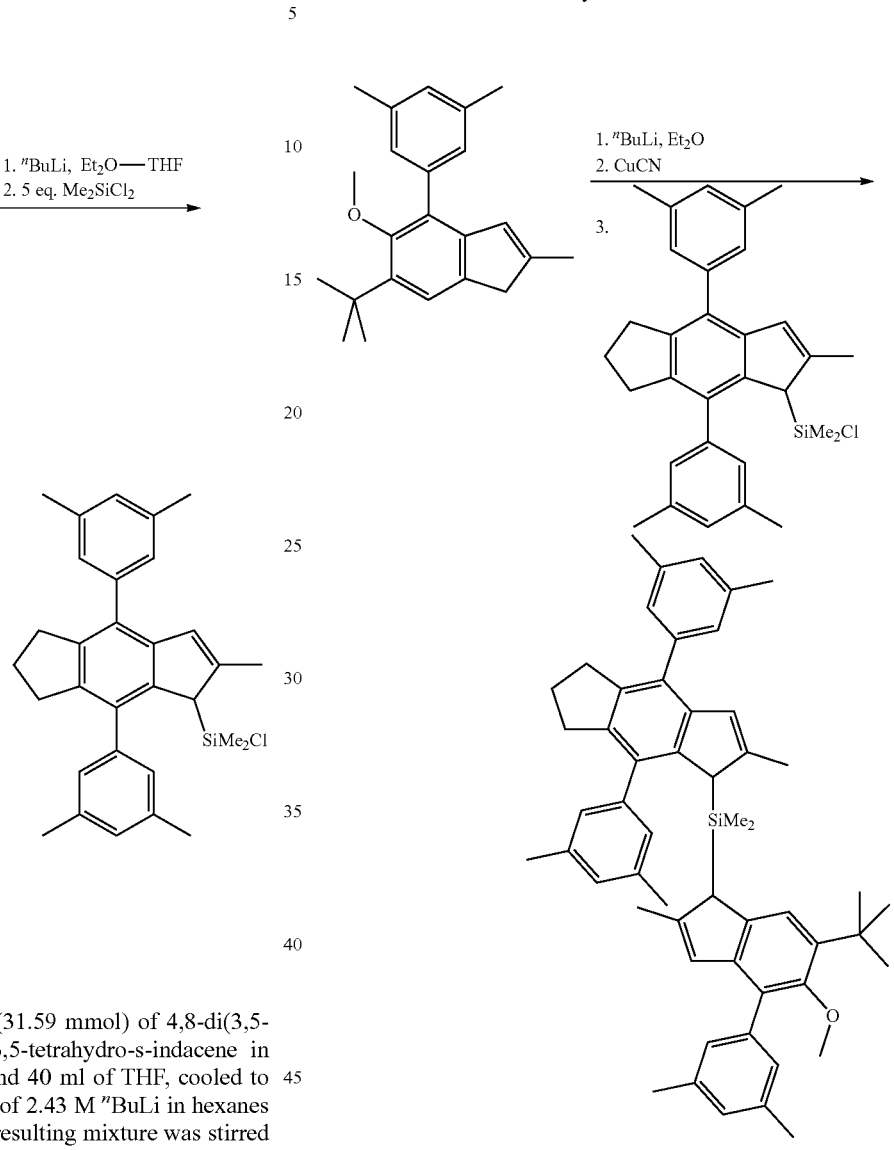

To a solution of 10.13 g (31.59 mmol) of 5-tert-butyl-7-(3,5-dimethylphenyl)-6-methoxy-2-methyl-1H-indene (produced as described above for MC-1) in 250 ml of ether, cooled to −30° C., 13.0 ml (31.59 mmol) of 2.43 M $^n$BuLi in hexanes was added in one portion. This mixture was stirred overnight at room temperature, then the resulting light-orange solution with a small amount of precipitate was cooled to −45° C., and 200 mg of CuCN was added. The obtained mixture was stirred for 0.5 h at −25° C., then a solution of 14.9 g (31.59 mmol) of [4,8-bis(3,5-dimethylphenyl)-2-methyl-1,5,6,7-tetrahydro-s-indacen-1-yl]chlorodimethylsilane (prepared above) in 200 ml of THF was added in one portion. This mixture was stirred overnight at room temperature, then filtered through a pad of silica gel 60 (40-63 μm), which was additionally washed by 2×50 ml of dichloromethane. The combined organic elute was evaporated to dryness, and the residue was dried in vacuum at elevated temperature to give 24.0 g (ca. 100% of ca. 90% purity) of the title product (ca. 55:45 mixture of the stereoisomers) as a slightly yellowish solid foam which was further used without an additional purification.

$^1$H NMR (CDCl$_3$): δ 7.27 and 7.25 (2s, sum 2H), 7.04 (s, 4H), 6.98, 6.95 and 6.93 (3s, sum 3H), 6.90 and 6.85 (2s, sum 1H), 6.46 (s, 1H), 6.23 and 6.20 (2s, sum 1H), 4.41 and 4.16 (2s, sum 1H), 3.30-2.62 (m, 1H), 3.22 and 3.20 (2s, sum 3H), 3.04-2.79 (m, 2H), 2.68-2.56 (m, 1H); 2.39 (s, 6H), 2.35 (s, 9H), 2.32 (s, 3H), 2.18-1.80 (6s and 2m, sum 9H), 1.44 and 1.38 (2s, sum 9H), −0.52, −0.58, −0.62 and −0.73 (4s, sum 6H).

Anti-dimethylsilanediyl[2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl]zirconium Dichloride

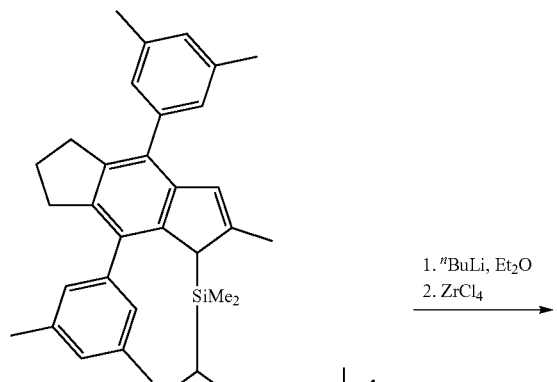

1. $^n$BuLi, Et$_2$O
2. ZrCl$_4$

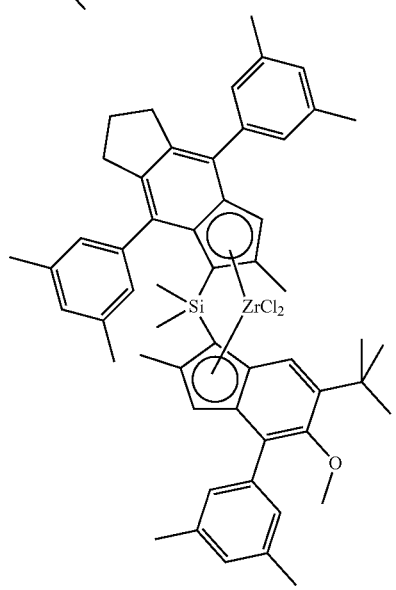

To a slightly cloudy yellowish solution of 23.06 g (30.54 mmol) of [4,8-bis(3,5-dimethylphenyl)-2-methyl-1,5,6,7-tetrahydro-s-indacen-1-yl][6-tert-butyl-4-(3,5-dimethylphenyl)-5-methoxy-2-methyl-1H-inden-1-yl]dimethylsilane in 250 ml of ether, cooled to −30° C., 25.1 ml (60.99 mmol) of 2.43 M $^n$BuLi in hexanes was added in one portion. This mixture was stirred for 5.5 h at room temperature, then, the resulting red solution was cooled to −50° C., and 7.12 g (30.55 mmol) of ZrCl$_4$ was added. The reaction mixture was stirred for 24 h at room temperature to give dark-red solution with precipitate of LiCl. On the evidence of NMR spectroscopy, this solution included a ca. 85/15 mixture of anti- and syn-zirconocene dichlorides contaminated with some other impurities. This mixture was evaporated to dryness (to the state of red foam), and the residue was treated with 100 ml of warm toluene. The obtained suspension was filtered through glass frit (G4), the filter cake was washed with 2×50 ml of warm toluene. The filtrate was evaporated to dryness, and the residue was dissolved in 70 ml of hot n-hexane. The light-orange precipitate fallen from this solution overnight at room temperature was collected and dried in vacuum. This procedure gave 7.8 g of anti-dimethylsilanediyl[2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl]zirconium dichloride, containing ca. 1.0 mol of n-hexane per mol of the complex, so the adjusted net weight of the isolated anti-complex was 7.13 g (26%). The mother liquor was evaporated to ca. 60 ml. Light-orange powder precipitated from this solution overnight at −25° C. was collected and dried in vacuum. This procedure gave 8.6 g of anti-dimethylsilanediyl[2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl]zirconium dichloride, containing ca. 0.75 mol of n-hexane per mol of the complex (or 0.57 g of n-hexane in 8.6 g of the product), so the adjusted net weight of the isolated anti-complex was 8.03 g (29%).

Anti-dimethylsilanediyl[2-methyl-4,8-di(3,5-dimethylphenyl)-1,5,6,7-tetrahydro-s-indacen-1-yl][2-methyl-4-(3,5-dimethylphenyl)-5-methoxy-6-tert-butylinden-1-yl]zirconium dichloride×1.0 $^n$hexane Anal. calc. for C$_{54}$H$_{60}$Cl$_2$OSiZr×C$_6$H$_{14}$: C, 71.96; H, 7.45. Found: C, 72.30; H, 7.69.

$^1$H NMR (CDCl$_3$): δ 7.55-6.90 (very br.s., 4H), 7.39 (s, 1H), 7.10 (s, 1H), 7.03 (s, 1H), 6.98 (s, 1H), 6.95 (s, 1H), 6.94 (s, 1H), 6.81 (s, 1H), 6.58 (s, 1H), 3.41 (s, 3H), 3.15-3.01 (m, 2H), 2.93 (ddd, J=16.0 Hz, 8.1 Hz, 3.3 Hz, 1H), 2.51-2.41 (m, 1H), 2.39 (s, 3H), 2.36 (s, 3H), 2.34 (s, 12H), 2.30 (s, 3H), 2.04 (s, 3H), 2.07-1.95 (m, 1H), 1.85-1.68 (m, 1H), 1.35 (s, 9H), 1.14 (s, 3H), −0.13 (s, 3H). $^{13}$C{$^1$H} NMR (CDCl$_3$): δ 159.87, 144.73, 144.10, 143.25, 141.39, 138.39, 138.08, 137.81, 137.47, 136.90, 134.61, 134.39, 134.26, 132.05, 131.96, 131.74, 131.11, 128.96, 128.91, 128.82, 128.74, 127.74, 127.44, 127.01 (br.s), 126.76, 123.42, 123.12, 121.60, 121.08, 82.55, 81.91, 62.67, 35.68, 33.87, 32.39, 30.39, 26.04, 21.53, 21.47, 21.41, 21.24, 19.78, 18.60, 3.62, 1.70.

Preparation of MAO-Silica Support

A steel reactor equipped with a mechanical stirrer and a filter net was flushed with nitrogen and the reactor temperature was set to 20° C. Next silica grade DM-L-303 from AGC Si-Tech Co, pre-calcined at 600° C. (5.0 kg) was added from a feeding drum followed by careful pressuring and depressurising with nitrogen using manual valves. Then toluene (22 kg) was added. The mixture was stirred for 15 min. Next 30 wt % solution of MAO in toluene (9.0 kg) from Lanxess was added via feed line on the top of the reactor within 70 min. The reaction mixture was then heated up to 90° C. and stirred at 90° C. for additional two hours. The slurry was allowed to settle and the mother liquor was filtered off. The catalyst was washed twice with toluene (22 kg) at 90° C., following by settling and filtration. The reactor was cooled off to 60° C. and the solid was washed with heptane (22.2 kg). Finally MAO treated SiO2 was dried at 60° under nitrogen flow for 2 hours and then for 5 hours under vacuum (−0.5 barg) with stirring. MAO treated support was collected as a free-flowing white powder found to contain 12.2% Al by weight.

Inventive Catalyst System 3 (ICS3) Catalyst Preparation 30 wt % MAO in toluene (0.7 kg) was added into a steel nitrogen blanked reactor via a burette at 20° C. Toluene (5.4 kg) was then added under stirring. Metallocene C2 (93 g) was added from a metal cylinder followed by flushing with 1 kg toluene. The mixture was stirred for 60 minutes at 20° C. Trityl tetrakis(pentafluorophenyl) borate (91 g) was then added from a metal cylinder followed by a flush with 1 kg of toluene. The mixture was stirred for 1 h at room temperature. The resulting solution was added to a stirred cake of MAO-silica support prepared as described above over 1 hour. The cake was allowed to stay for 12 hours, followed by drying under N2 flow at 60° C. for 2 h and additionally for 5 h under vacuum (−0.5 barg) under stirring.

Dried catalyst was sampled in the form of pink free flowing powder containing 13.9% Al and 0.11% Zr.

Comparative Catalyst System 4 (CCS4)

30 wt % MAO in toluene (0.7 kg) was added into a steel nitrogen blanked reactor via a burette at 20° C. Toluene (6.4 kg) was then added under stirring. Metallocene C2 (93 g) was added from a metal cylinder followed by flushing with 1 kg toluene. The mixture was stirred for 60 minutes at 20° C. The resulting solution was added to a stirred cake of MAO-silica support prepared as described above over 1 hour. The cake was allowed to stay for 12 hours, followed by drying under N2 flow at 60° C. for 2 h and additionally for 5 h under vacuum (−0.5 barg) under stirring.

Dried catalyst was sampled in the form of pink free flowing powder containing 12.8% Al and 0.084% Zr Polymerizations:

Prepolymerization and Bulk Polymerization

A 21.2 L autoclave containing 0.4 barg propylene was filled with 3950 g propylene. Triethylaluminum (0.80 ml of a 0.62 mol/l solution in heptane) was injected into the reactor by additional 240 g propylene. The solution was stirred at 20° C. and 250 rpm for at least 20 min. The desired H2 amount is fed into the reactor via mass flow controller. The catalyst was injected as described in the following. The desired amount of solid catalyst was loaded into a 5 ml stainless steel vial inside a glovebox, then a second 5 ml vial containing 4 ml n-heptane and pressurized with 7 bars of nitrogen was added on top of it. This dual feeder system was mounted on a port on the lid of the autoclave. Afterwards the valve between the two vials was opened and the solid catalyst was contacted with heptane under nitrogen pressure for 2 s, and then flushed into the reactor with 240 g propylene. The prepolymerization was run for 10 min. At the end of the prepolymerization step, the temperature was raised to 75° C. and was held constant throughout the polymerization. In case of ethylene-propylene copolymerization experiments, ethylene was added starting at 55° C. Amounts and feeding rate can be found in the table 4. The polymerization time was measured starting when the internal reactor temperature reached 2° C. below the set polymerization temperature. When the desired polymerization time had lapsed, 5 ml ETOH was fed into the reactor to stop the polymerization. Then the reactor was cooled down to about 30° C. and the volatile components flashed out. After purging the reactor 3 times with N2 and one vacuum/N2 cycle, the product was taken out and dried overnight in a fume hood. 100 g of the polymer was additivated with 0.5 wt % Irganox B225 (solution in acetone) and dried overnight in a hood followed by 2 hours in a vacuum drying oven at 60° C.

The exact amounts of catalyst, H2 and C2 can be seen in table 4:

TABLE 4

| Example | Catalyst | catalyst amount mg | MC content of unprepped catalyst wt % | MC amount mg | Propylene g | Hydrogen NL | | Time transition from prepoly to bulk min | ethylene g | ethylene feed rate g/min | temperature of ethylene addition ° C. | temp. av. bulk ° C. | time min |
|---|---|---|---|---|---|---|---|---|---|---|---|---|---|
| IE5 | ICS3 | 48.0 | 1.10 | 0.53 | 4463 | 2.01 | prepoly- | 17 | | | | 75 | 40 |
| IE6 | ICS3 | 24.0 | 1.10 | 0.26 | 4460 | 2.01 | merisation | 18 | 20 | 5 | 55 | 75 | 40 |
| IE7 | ICS3 | 19.0 | 1.10 | 0.21 | 4460 | 2.01 | at 20° C. | 18 | 50 | 10 | 55 | 75 | 40 |
| IE8 | ICS3 | 20.0 | 1.10 | 0.22 | 4479 | 2.00 | for | 18 | 109 | 25 | 55 | 75 | 40 |
| IE9 | ICS3 | 18.0 | 1.10 | 0.20 | 4460 | 2.01 | 10 min | 17 | 168 | 35 | 56 | 75 | 40 |
| CE5 | CCS4 | 50.0 | 0.86 | 0.43 | 4455 | 2.00 | | 16 | | | | 75 | 40 |
| CE6 | CCS4 | 34.0 | 0.86 | 0.29 | 4463 | 2.00 | | 17 | 20 | 5 | 55 | 75 | 40 |
| CE7 | CCS4 | 31.0 | 0.86 | 0.27 | 4463 | 2.00 | | 17 | 50 | 5 | 55 | 75 | 40 |
| CE8 | CCS4 | 28.0 | 0.86 | 0.24 | 4480 | 2.00 | | 17 | 109 | 25 | 55 | 75 | 40 |
| CE9 | CCS4 | 24.0 | 0.86 | 0.21 | 4480 | 2.00 | | 17 | 168 | 35 | 55 | 75 | 40 |

Table 5 Shows the Results of the Polymerization

TABLE 5

| Example | Catalyst | catalyst productivity kg/g cat | metallocene productivity kg/gMC | MFR2 powder g/10min | $T_m$ °C. | $M_w$ g/mol | $M_w/M_n$ | Ethylene in polymer (NMR) wt % |
|---|---|---|---|---|---|---|---|---|
| IE5 | ICS3 | 24.7 | 2242 | 4.7 | 156 | 278000 | 3.1 | 0.00 |
| IE6 | ICS3 | 32.5 | 2955 | 6.0 | 152 | 247000 | 3.0 | 0.3 |
| IE7 | ICS3 | 44.7 | 4062 | 5.7 | 146 | 246000 | 3.1 | 0.9 |
| IE8 | ICS3 | 52.5 | 4768 | 3.4 | 137 | 286500 | 2.9 | 2.2 |
| IE9 | ICS3 | 65.9 | 5995 | 1.2 | 127 | 344000 | 2.9 | 3.5 |
| CE5 | CCS4 | 13.7 | 1593 | 5.0 | 151 | 254000 | 3.2 | 0.0 |
| CE6 | CCS4 | 16.8 | 1949 | 7.0 | 148 | 254500 | 3.1 | 0.4 |
| CE7 | CCS4 | 18.3 | 2131 | 8.3 | 143 | 252000 | 3.1 | 0.9 |
| CE8 | CCS4 | 15.4 | 1786 | 5.0 | 135 | 284500 | 3.1 | 2.4 |
| CE9 | CCS4 | 11.9 | 1386 | 2.2 | 125 | 315500 | 3.4 | 3.6 |

Figure 5:
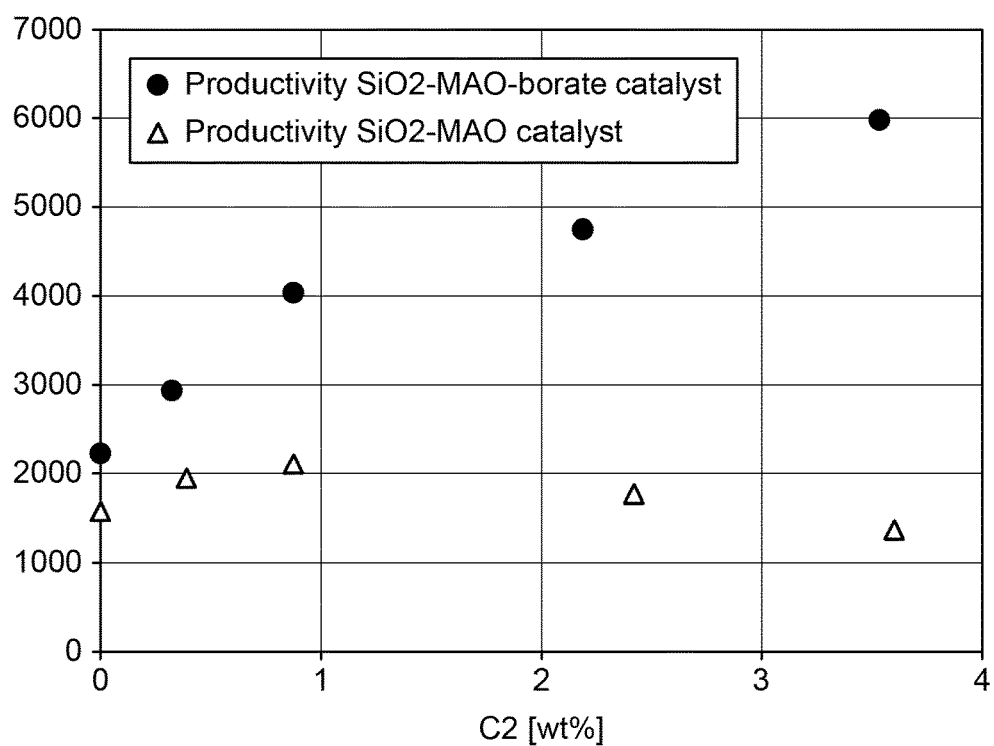
FIG. 5 plots the ethylene content of the polymer vs the productivity for examples of the invention.
Figure 6:
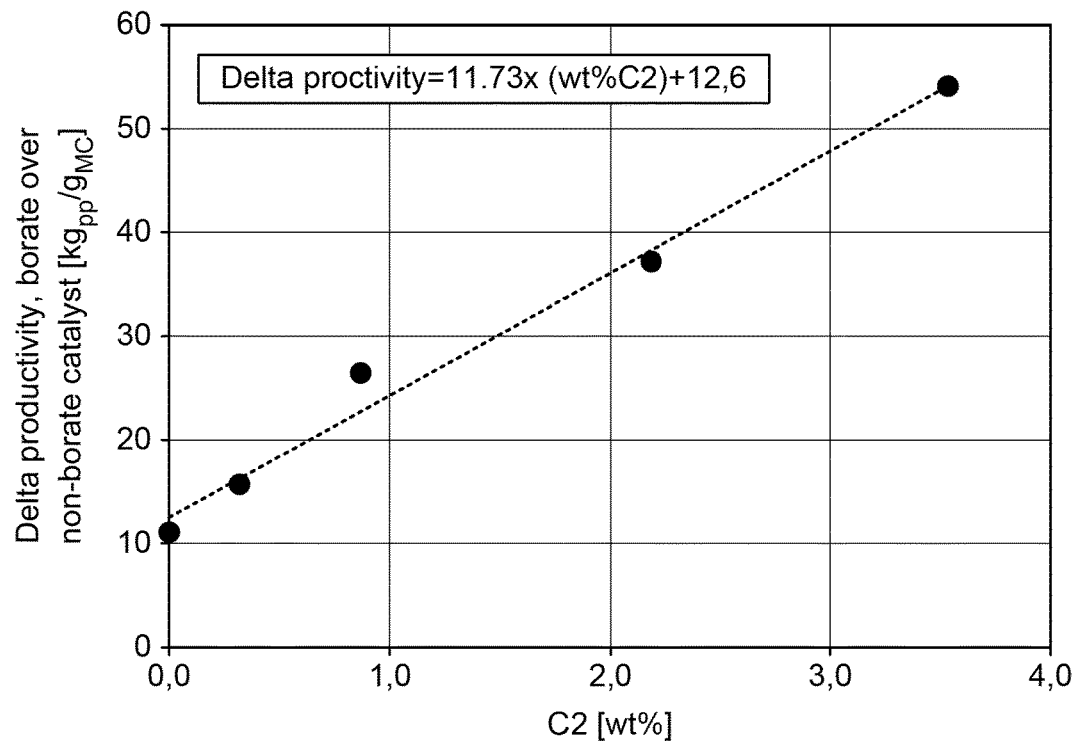
FIG. 6 plots the ethylene content of the polymer vs the delta productivity for examples of the invention.

From FIGS. 5 and 6 one can easily see that the more ethylene is added the bigger is the difference in productivity using the catalyst system according to the invention compared to catalyst systems without the boron containing cocatalyst.

Figure 7:
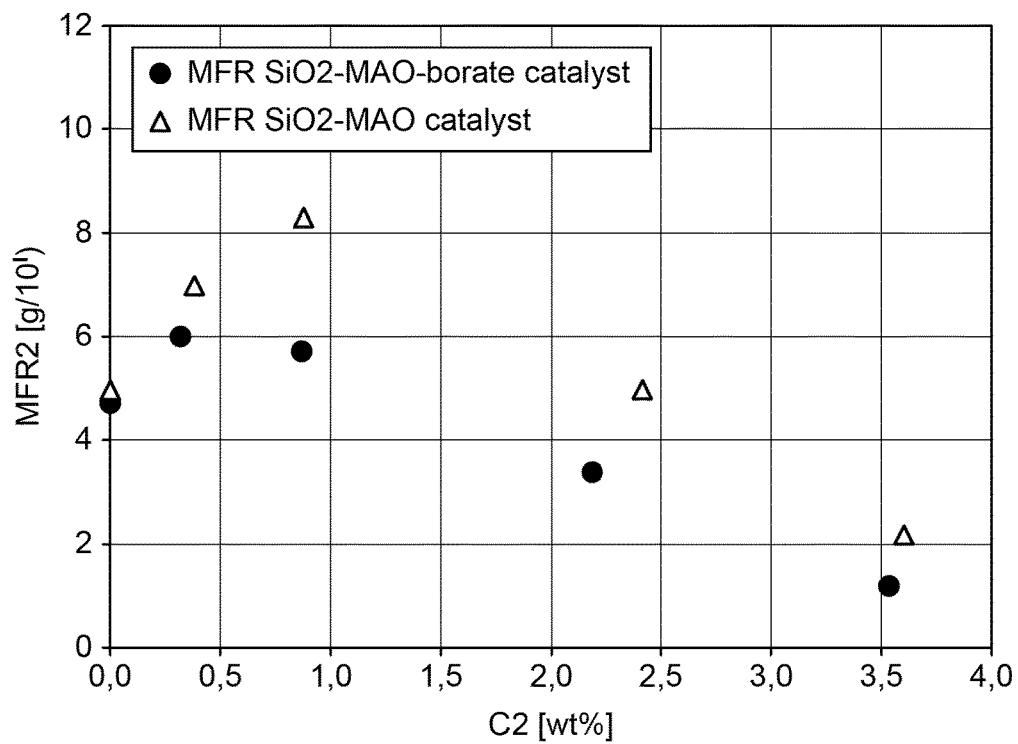
FIG. 7 plots the ethylene content of the polymer vs the MFR for examples of the invention.

The silica-MAO catalyst containing the tritylborate coactivator has also a slightly better MFR control (lower MFR at same H2 concentration) at any given C2 content compared to the non-borate catalyst. This effect is seen in FIG. 7.

The invention claimed is:

1. A supported catalyst system comprising:
   (i) a metallocene complex;
   (ii) a cocatalyst system comprising a boron containing cocatalyst and a methylaluminoxane cocatalyst; and
   (iii) an inorganic porous support;
   wherein the metallocene complex is of formula (I):

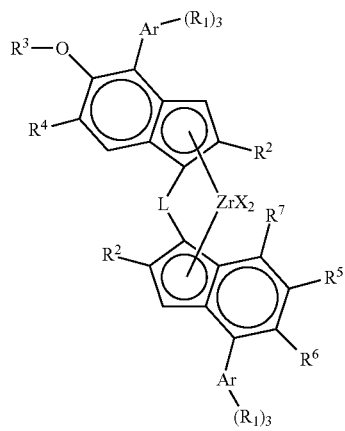

Formula (I)

wherein
each X independently is a sigma-donor ligand;
L is —R'$_2$Si—, and each R' is independently a $C_1$-$C_6$-alkyl, $C_{5-6}$-cycloalkyl, or $C_6$-aryl group;

each Ar independently is a phenyl ring or a 5 or 6 membered heteroaryl ring;

each $R^1$ is bonded to a carbon and independently is hydrogen, or a linear or branched $C_1$-$C_6$-alkyl group;

each $R^2$ independently is a CHR$^{8'}$—R$^8$ group, with R$^8$ being H, or a linear or branched $C_{1-6}$-alkyl group, and $R^{8'}$ is H or a $C_{1-6}$ alkyl;

$R^3$ is a linear or branched $C_1$-$C_6$-alkyl group, a $C_{7-20}$-arylalkyl group, a $C_{7-20}$-alkylaryl group, or $C_6$-$C_{20}$-aryl group;

$R^4$ is a C(R$^9$)$_3$ group, with each R$^9$ independently being a linear or branched $C_1$-$C_6$-alkyl group;

$R^5$ and $R^6$ are both hydrogen, or $R^5$ and $R^6$ taken together form a 5 membered saturated carbon ring;

$R^7$ is a linear or branched $C_1$-$C_6$-alkyl group, or an aryl or heteroaryl group having 3 to 20 carbon atoms optionally substituted by one to three groups $R^{11}$; and each $R^{11}$ independently is hydrogen, or a linear or branched $C_1$-$C_6$-alkyl group;

wherein the boron containing cocatalyst is either of formula (B) or a borate containing an anion of formula (C):

BY$_3$ (B)

(Z)$_4$B— (C)

wherein each Y independently is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine; or Z is an optionally substituted phenyl derivative, said substituent being a halo-C1-6-alkyl or halo group, and as counterions protonated amine or aniline derivatives.

2. The supported catalyst system of claim 1, wherein the metallocene complex is of formula (II):

Formula (II)

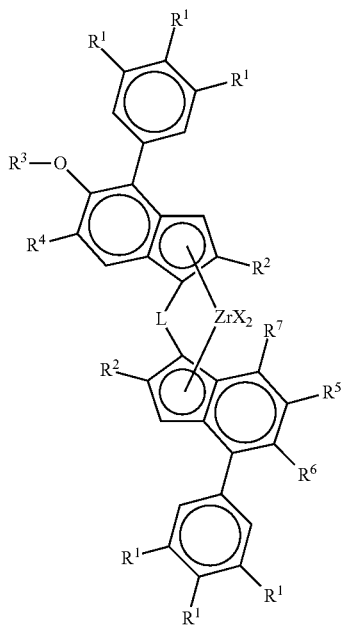

wherein
each X independently is a sigma-donor ligand;
L is —R'$_2$Si—, and each R' is independently a C$_1$-C$_6$-alkyl, C$_{5-6}$-cycloalkyl, or C$_6$-aryl group;
each R$^1$ is bonded to a phenyl carbon and independently is hydrogen, or a linear or branched C$_1$-C$_6$-alkyl group;
each R$^2$ independently is a CHR$^{8'}$—R$^8$ group, with R$^8$ being H or a linear or branched C$_{1-6}$-alkyl group, and R$^{8'}$ is H or a C$_{1-6}$ alkyl;
R$^3$ is a linear or branched C$_1$-C$_6$-alkyl group, a C$_{7-20}$ arylalkyl group, a C$_{7-20}$ alkylaryl group, or a C$_6$-C$_{20}$-aryl group;
R$^4$ is a C(R$^9$)$_3$ group, with each R$^9$ independently being a linear or branched C$_1$-C$_6$ alkyl group;
R$^5$ and R$^6$ are both hydrogen, or R$^5$ and R$^6$ taken together form a 5 membered saturated carbon ring;
R$^7$ is a linear or branched C$_1$-C$_6$-alkyl group, or an aryl or heteroaryl group having 3 to 20 carbon atoms optionally substituted by one to 3 groups R$^{11}$; and
each R$^{11}$ independently is hydrogen, or a linear or branched C$_1$-C$_6$-alkyl group.

3. The supported catalyst system according to claim 1, wherein in the formula (I) of the metallocene complex (i):
each X independently is a hydrogen atom, a halogen atom, a linear, branched, or cyclic C$_{1-20}$-alkyl or -alkoxy group, a C$_{6-20}$-aryl group, a C$_{7-20}$-alkylaryl group, or a C$_{7-20}$-arylalkyl group;
each R$^1$ is independently hydrogen, or a linear or branched C$_1$-C$_6$-alkyl group;
both R$^2$ are the same and are a CH$_2$—R$^8$ group, with R$^8$ being H or linear or branched C$_1$-C$_4$-alkyl group;
R$^3$ is a linear or branched C$_1$-C$_6$-alkyl group or C$_{6-20}$-aryl group;
R$^4$ is a C(R$^9$)$_3$ group, with each R$^9$ independently being a linear or branched C$_1$-C$_4$-alkyl group;
R$^5$ and R$^6$ are both hydrogen, or R$^5$ and R$^6$ taken together form a 5 membered saturated carbon ring;
R$^7$ is a linear or branched C$_1$-C$_6$-alkyl group, or an aryl or heteroaryl group having 3 to 20 carbon atoms optionally substituted by 1 to 3 groups R$^{11}$; and
each R$^{11}$ independently being hydrogen, or a linear or branched C$_1$-C$_6$-alkyl group.

4. The supported catalyst system according to claim 1, wherein in formula (I) of the metallocene complex:
L is —R'$_2$Si—, wherein each R' is independently a C$_1$-C$_6$-alkyl, C$_{5-6}$-cycloalkyl, or C$_6$-aryl group;
each Ar independently is a phenyl ring or a 5 or 6 membered heteroaryl ring;
each R$^1$ is independently hydrogen, or a linear or branched C$_1$-C$_6$-alkyl group;
each R$^2$ independently is a CHR$^{8'}$—R$^8$ group, with R$^8$ being H or a linear or branched C$_{1-6}$-alkyl group, and R$^{8'}$ is H or a C$_{1-6}$ alkyl;
R$^3$ is a linear or branched C$_1$-C$_6$-alkyl group;
R$^5$ and R$^6$ taken together form a 5 membered saturated carbon ring;
R$^7$ is a phenyl ring or a 5 or 6 membered heteroaryl ring optionally substituted by one to three groups R$^{11}$; and
each R$^{11}$ independently is hydrogen, or a linear or branched C$_1$-C$_6$-alkyl group.

5. The supported catalyst system according to claim 2, wherein in formula (II) of the metallocene complex:
each X independently is a halogen atom, a linear or branched C$_{1-4}$-alkyl group, a linear or branched C$_{1-4}$-alkoxy group, a phenyl group, or a benzyl group,
L is or —R'$_2$Si—, wherein each R' is independently a C$_1$-C$_6$-alkyl, C$_{5-6}$-cycloalkyl or C$_6$-aryl group;
each R$^1$ independently is hydrogen, or a linear or branched C$_1$-C$_6$-alkyl group;
each R$^2$ independently is a CH$_2$—R$^8$ group, with R$^8$ being H or a linear or branched C$_{1-6}$-alkyl group;
R$^3$ is a linear or branched C$_1$-C$_6$-alkyl group;
R$^5$ and R$^6$ are each hydrogen, or R$^5$ and R$^6$ taken together form a 5 membered saturated carbon ring;
R$^7$ is a phenyl group optionally substituted by one to 3 groups R$^{11}$; and
each R$^{11}$ independently is hydrogen, or a linear or branched C$_1$-C$_6$-alkyl group.

6. The supported catalyst system according to claim 2, wherein in formula (II) of the metallocene complex:
each X independently a halogen atom, a linear or branched C$_{1-4}$-alkyl group, a linear or branched C$_{1-4}$-alkoxy group, a phenyl group, or a benzyl group;
L is —R'$_2$Si—, wherein each R' is independently a C$_1$-C$_6$-alkyl, C$_{5-6}$-cycloalkyl, or C$_6$-aryl group;
each R$^1$ independently is hydrogen, or a linear or branched C$_1$-C$_6$-alkyl group;
each R$^2$ is methyl;
R$^3$ is a linear or branched C$_1$-C$_6$-alkyl group;
R$^5$ and R$^6$ taken together form a 5 membered saturated carbon ring;
R$^7$ is a phenyl group optionally substituted by one to 3 groups R$^{11}$; and
each R$^{11}$ independently is hydrogen, or a linear or branched C$_1$-C$_6$-alkyl group.

7. The supported catalyst system according to claim 1, wherein the metallocene complex is of formula (X):

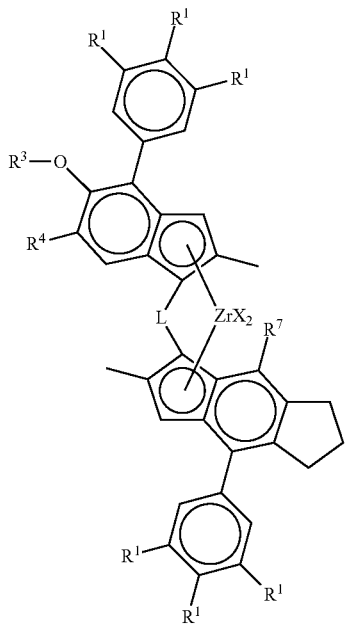

(XI)

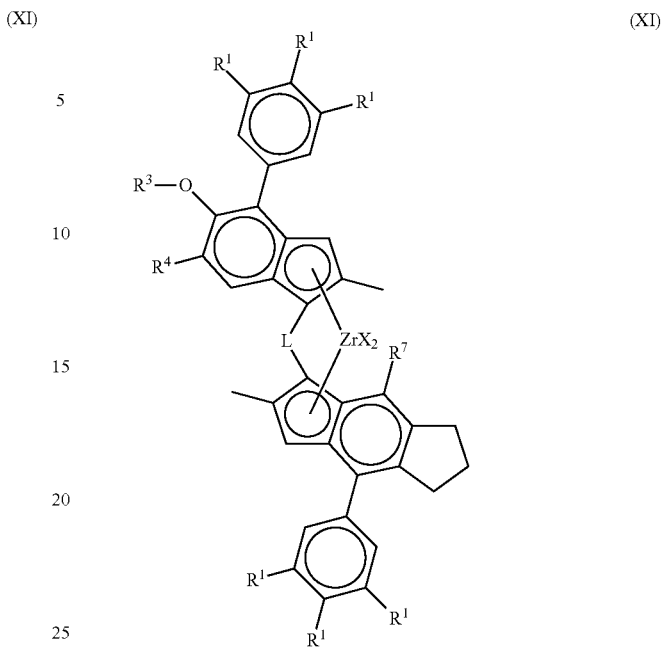

wherein each X independently is a halogen atom, a linear or branched $C_{1-4}$-alkyl group, a linear or branched $C_{1-4}$-alkoxy group, a phenyl group, or benzyl group;

L is —R'$_2$Si—, wherein each R' is independently a $C_1$-$C_6$-alkyl, $C_{5-6}$-cycloalkyl, or $C_6$-aryl group;

each $R^1$ independently is hydrogen, or a linear or branched $C_1$-$C_6$-alkyl group;

each $R^2$ independently is a CH$_2$—$R^8$ group, with $R^8$ being H or a linear or branched $C_{1-6}$-alkyl group;

$R^3$ is a linear or branched $C_1$-$C_6$-alkyl group;

$R^4$ is a C($R^9$)$_3$ group, with each $R^9$ independently being a linear or branched $C_1$-$C_6$ alkyl group;

$R^7$ is a phenyl group optionally substituted by one to 3 groups $R^{11}$; and each $R^{11}$ independently is hydrogen, or a linear or branched $C_1$-$C_6$-alkyl group.

8. The supported catalyst system according to claim 1, wherein the metallocene complex is of formula (XI):

(XI)

wherein each X independently is a halogen atom, a linear or branched $C_{1-4}$-alkyl group, a linear or branched $C_{1-4}$-alkoxy group, a phenyl group, or benzyl group;

L is —R'$_2$Si—, wherein each R' is independently a $C_1$-$C_6$-alkyl, $C_{5-6}$-cycloalkyl, or $C_6$-aryl group;

each $R^1$ independently is hydrogen, or a linear or branched $C_1$-$C_6$-alkyl group;

$R^3$ is a linear or branched $C_1$-$C_6$-alkyl group;

$R^4$ is a C($R^9$)$_3$ group, with each $R^9$ independently being a linear or branched $C_1$-$C_6$ alkyl group;

$R^7$ is a phenyl group optionally substituted by one to 3 groups $R^{11}$; and each $R^{11}$ independently is hydrogen, or a linear or branched $C_1$-$C_6$-alkyl group.

9. The supported catalyst system according to claim 8, wherein in formula (XI) of the metallocene complex L is -Me$_2$Si—.

10. The supported catalyst system according to claim 1, wherein the metallocene complex (i) is selected from the group consisting of:

rac-anti-dimethylsilanediyl[2-methyl-4-(3',5'-tert-butylphenyl)-1,5,6,7-tetrahydro-s-indacen-1-yl][2-methyl-4-(3',5'-dimethyl-phenyl)-5-methoxy-6-tert-butylinden-1-yl]zirconium dichloride, rac-anti-dimethylsilanediyl[2-methyl-4,8-bis-(4'-tert-butylphenyl)-1,5,6,7-tetrahydro-s-indacen-1-yl][2-methyl-4-(3',5'-dimethyl-phenyl)-5-methoxy-6-tert-butylinden-1-yl]zirconium dichloride, rac-anti-dimethylsilanediyl[2-methyl-4,8-bis-(3',5'-dimethylphenyl)-1,5,6,7-tetrahydro-s indacen-1-yl][2-methyl-4-(3',5'-dimethylphenyl)-5-methoxy-6-tert-butylinden-1-yl]zirconium dichloride, and rac-anti-dimethylsilanediyl[2-methyl-4,8-bis-(3',5'-dimethylphenyl)-1,5,6,7-tetrahydro-s-indacen-1-yl][2-methyl-4-(3',5'-ditert-butyl-phenyl)-5-methoxy-6-tert-butylinden-1-yl]zirconium dichloride.

11. The supported catalyst system according to claim 1, wherein the boron containing cocatalyst is:
triphenylcarbeniumtetrakis(pentafluorophenyl) borate,
N,N-dimethylaniliniumtetrakis(pentafluorophenyl) borate,
N,N-dimethylcyclohexylammoniumtetrakis(pentafluorophenyl)borate, or
N,N-dimethylbenzylammoniumtetrakis(pentafluorophenyl)borate.

12. The supported catalyst system according to claim 1, wherein the metallocene complex, the boron containing cocatalyst, and the methylaluminoxane cocatalyst are each provided in an amount such that the molar ratio of boron in the boron containing cocatalyst to the Zirconium in the complex of formula (I) is in the range of 0.1:1 to 10:1 mol/mol, and the molar ratio of aluminum in the methylaluminoxane cocatalyst to the zirconium in the complex of formula (I) is in the range of 1:1 to 2000:1 mol/mol.

13. The supported catalyst system according to claim 1, wherein the inorganic porous support has an average particle size of from 10 to 100 m, an average pore size of from 10 to 100 nm, a pore volume of from 1 to 3 mL/g, or a combination thereof.

14. The supported catalyst system according to claim 1, wherein the catalyst system can contain from 10 to 100 mol of zirconium per gram of the inorganic porous support and from 5 to 10 mmol of Al per gram of the inorganic porous support.

15. A process for preparing the supported catalyst system according to claim 1, the process comprising the steps of:
a) reacting the inorganic porous support with a first portion of the methylaluminoxane cocatalyst in a first suitable hydrocarbon solvent, with optional subsequent drying, to obtain a methylaluminoxane cocatalyst treated support,
b) reacting the metallocene complex with a second portion of the methylaluminoxane cocatalyst in a second suitable hydrocarbon solvent,
c) adding the boron containing cocatalyst to the solution obtained in step b) to obtain a solution of the metallocene complex, boron containing cocatalyst, and methylaluminoxane cocatalyst, whereby the boron containing cocatalyst is added in an amount such that a boron/zirconium molar ratio is in the range of 0.1:1 to 10:1,
d) adding the solution obtained in step c) to the methylaluminoxane cocatalyst treated support obtained in step a) wherein the first portion of the methylaluminoxane cocatalyst added in step a) is 75.0 to 97.0 wt % of the total amount of the methylaluminoxane cocatalyst, and the second portion of the methylaluminoxane cocatalyst added in step b) is 3.0 to 25.0 wt % of the total amount of methylaluminoxane cocatalyst; and
e) after step d), drying the supported catalyst system.

16. A process for the preparation of a heterophasic polypropylene copolymer, the process comprising:
(I) polymerizing propylene in bulk in the presence of the supported catalyst system as claimed in claim 1 to form a polypropylene homopolymer matrix; and
(II) in the presence of said polypropylene homopolymer matrix and said supported catalyst system, polymerizing propylene and ethylene in the gas phase to form a heterophasic polypropylene copolymer comprising a homopolymer matrix and an ethylene propylene rubber.

17. A process for the preparation of a heterophasic polypropylene copolymer, the process comprising:
(I) polymerizing propylene in bulk in the presence of the supported catalyst system as claimed in claim 1 to form a polypropylene homopolymer;
(II) in the presence of said polypropylene homopolymer and said supported catalyst system, polymerizing propylene in the gas phase to form a polypropylene homopolymer matrix; and
(III) in the presence said polypropylene homopolymer matrix and said supported catalyst system, polymerizing propylene and ethylene in the gas phase to form a heterophasic polypropylene copolymer comprising a homopolymer matrix and an ethylene propylene rubber (EPR).

* * * * *